(12) United States Patent
Oz et al.

(10) Patent No.: US 10,002,479 B2
(45) Date of Patent: Jun. 19, 2018

(54) END TO END SYSTEM FOR SERVICE DELIVERY TO AND FROM A VEHICLE USING A DONGLE

(71) Applicant: Continental Intelligent Transportation Systems, LLC, Santa Clara, CA (US)

(72) Inventors: Seval Oz, San Jose, CA (US); Yao Zhai, Fremont, CA (US)

(73) Assignee: Continental Intelligent Transportation Systems, LLC, Santa Clara, CA (US)

( * ) Notice: Subject to any disclaimer, the term of this patent is extended or adjusted under 35 U.S.C. 154(b) by 0 days. days.

(21) Appl. No.: 14/866,154

(22) Filed: Sep. 25, 2015

(65) Prior Publication Data
US 2016/0098876 A1   Apr. 7, 2016

Related U.S. Application Data

(60) Provisional application No. 62/058,410, filed on Oct. 1, 2014.

(51) Int. Cl.
*G07C 9/00* (2006.01)
*H04W 4/02* (2018.01)
(Continued)

(52) U.S. Cl.
CPC .......... *G07C 9/00309* (2013.01); *G01S 19/14* (2013.01); *G01S 19/42* (2013.01);
(Continued)

(58) Field of Classification Search
CPC .......... G01S 19/14; G01S 19/42; G01S 19/01; B60R 25/20; H04W 12/08; H04W 4/02;
(Continued)

(56) References Cited

U.S. PATENT DOCUMENTS

| 5,864,297 A | 1/1999 | Sollestre et al. |
| 6,073,064 A | 6/2000 | Konrad et al. |

(Continued)

FOREIGN PATENT DOCUMENTS

| EP | 1 564 690 | 8/2005 |
| WO | WO 2013/092306 A2 | 6/2013 |

(Continued)

OTHER PUBLICATIONS

International Search Report and Written Opinion for International Patent Application No. PCT/US2015/053300 dated Feb. 2, 2016, 13 pages, International Searching Authority, Alexandria VA.

(Continued)

*Primary Examiner* — Dionne H Pendleton

(57) ABSTRACT

A dongle module to be installed in a vehicle is discussed. The dongle module has memory buffers and processors. The dongle module also has a first transceiver that couples the on-board diagnostic (OBD) port of the vehicle to communicate with a fault and diagnostic module of the vehicle. A second transceiver uses wireless communications to communicate with one or more client devices. An RF transmitter transmits RF signals to Remote Keyless Entry (RKE) module of the vehicle. A mapping module either include a first map calculating chip to calculate map coordinates of the vehicle, or periodically receive map coordinates from a client device. A security module is configured either to receive, or to implement an algorithm to determine, a rolling security key of the RKE module of the vehicle. The security module also receives commands to be transmitted by the RF transmitter to the RKE module to be executed.

5 Claims, 27 Drawing Sheets

(51) Int. Cl.
*G06Q 50/28* (2012.01)
*G06Q 50/26* (2012.01)
*G01S 19/42* (2010.01)
*G07C 5/02* (2006.01)
*G07C 5/08* (2006.01)
*G07C 5/00* (2006.01)
*G01S 19/14* (2010.01)

(52) U.S. Cl.
CPC ........... *G06Q 50/265* (2013.01); *G06Q 50/28* (2013.01); *G07C 5/008* (2013.01); *G07C 5/02* (2013.01); *G07C 5/08* (2013.01); *G07C 9/00111* (2013.01); *G07C 9/00571* (2013.01); *G07C 2009/00341* (2013.01); *G07C 2009/00396* (2013.01); *G07C 2009/00492* (2013.01); *G07C 2009/00769* (2013.01); *G07C 2205/02* (2013.01); *G07C 2209/63* (2013.01)

(58) Field of Classification Search
CPC ......... H04W 4/046; G07C 2009/00341; G07C 2009/00396; G07C 2009/00492; G07C 2009/00769; G07C 2205/02; G07C 5/008; G07C 5/02; G07C 5/08; G07C 9/00309; G07C 9/00571
See application file for complete search history.

(56) References Cited

U.S. PATENT DOCUMENTS

| | | |
|---|---|---|
| 6,529,808 B1 | 3/2003 | Diem |
| 7,432,796 B2 | 10/2008 | Kawamura et al. |
| 8,232,897 B2 | 7/2012 | Tieman et al. |
| 8,841,987 B1 | 9/2014 | Stanfield et al. |
| 2006/0049925 A1 | 3/2006 | Hara et al. |
| 2008/0021747 A1 | 1/2008 | Moeller et al. |
| 2009/0160607 A1 | 6/2009 | Edwards et al. |
| 2011/0032075 A1 | 2/2011 | Alrabady et al. |
| 2011/0112969 A1 | 5/2011 | Zaid et al. |
| 2011/0257817 A1 | 10/2011 | Tieman |
| 2013/0238167 A1 | 9/2013 | Stanfield et al. |
| 2014/0180959 A1 | 6/2014 | Gillen et al. |
| 2014/0227991 A1 | 8/2014 | Breton et al. |
| 2014/0229501 A1 | 8/2014 | Josefiak |
| 2014/0274013 A1 | 9/2014 | Santavicca |
| 2015/0161834 A1* | 6/2015 | Spahl .................. G07C 9/00111 340/5.61 |
| 2015/0215779 A1 | 7/2015 | Fokkelman et al. |
| 2017/0263120 A1* | 9/2017 | Durie, Jr. .......... G06F 17/30823 |

FOREIGN PATENT DOCUMENTS

| | | |
|---|---|---|
| WO | WO 2014/052329 A1 | 4/2014 |
| WO | WO 2014/089171 A1 | 6/2014 |

OTHER PUBLICATIONS

Continental: Open Sesame: Continental With mobile phones are at a great car keys Nov. 13, 2011, (6 pages).

"Cardrops, your car becomes an e-commerce delivery point"; downloaded from Internet Sep. 27, 2015, 5 pages, http://www.cardrops.com.

Behrmann, Elisabeth; Weiss, Richard, "Volvo Said to Near Deal to Deliver Parcels to Parked Cars" 6 pages. Nov. 17, 2014. Downloaded Dec. 10, 2014 from www.bloomberg.com/news/2014-11-17/volvo-said-to-near-deal . . . .

* cited by examiner

Box2Go System Architecture

END TO END SYSTEM FOR SERVICE DELIVERY TO AND FROM A VEHICLE USING A DONGLE

RELATED APPLICATIONS

This application claims the benefit of U.S. Provisional Patent Application No. 62/058,410, filed Oct. 1, 2014, and entitled "PACKAGE DELIVERY TO AND PICK-UP FROM A VEHICLE", and is incorporated herein by reference.

FIELD

The design generally relates to delivery of services to and from a vehicle system.

BACKGROUND

Typically, delivery services are sent to the home address of the customer and maintenance services are delivered at a shop. This technology instead delivers services to and from a customer's vehicle while ensuring safe delivery at the delivery location.

SUMMARY

In general, a dongle module installed in a vehicle is described. The dongle module has one or more memory buffers and one or more processors. The dongle module also has a first transceiver that can couple to an on-board diagnostic (OBD) port of the vehicle and to communicate with a fault and diagnostic module of the vehicle and has a second transceiver that can use wireless communications to communicate with a one or more client devices, including a first client device and a second client device. The dongle module also includes a Radio Frequency (RF) transmitter that can transmit RF signals to command a Remote Keyless Entry (RKE) module of the vehicle. A mapping module in the dongle module can include a first map calculating chip that can receive map locating signals and to calculate map coordinates of the vehicle. Alternatively, the mapping module can periodically request from the first client device, via the second transceiver, the map coordinates of the vehicle. The mapping module can send map coordinates of the vehicle to a backend cloud based server. The GPS map coordinates of the vehicle can be stored in the one or more memory buffers. A security module in the dongle module can receive, via the second transceiver a current rolling security key of the RKE module of the vehicle from the second client device. Alternatively, the security module in the dongle module can receive a first algorithm and a first data from the second client device. The first algorithm can be implemented in a first routine of the security module running on the one or more processors of the dongle module. The first algorithm can use the first data to determine the current rolling security key of the RKE module of the vehicle. The current rolling security key of the RKE module of the vehicle can be stored in the one or more memory buffers. The security module can also receive from the second client device, via the second transceiver, one or more commands including a first command. The security module sends the first command and the current rolling security key to the RKE module through commanding the RF transmitter to transmit RF signals to the RKE module of the vehicle such that the transmitted RF signals include the received first command and the current rolling security key. Then, the RKE module of the vehicle validates the current rolling security key and executes the first command.

In an embodiment, a cloud-based system-for-geo-proximity-access to a target vehicle includes one or more cloud based servers having a first group of one or more processors and one or more ports. The servers can cooperate with one or more cloud based databases. A Global Positioning System (GPS) based proximity and control module running on the first group of one or more processors that can execute instructions to ensure secure access by a service delivery person associated with a service delivery vehicle to the target vehicle. The GPS-based proximity and control module can receive, via a first cellular communication, current GPS coordinates of the target vehicle from a first client device associated with the target vehicle. The GPS-based proximity and control module can also receive, via a second cellular communication, current GPS coordinates of the service delivery vehicle from a second client device associated with the service delivery person. The current GPS coordinates of the service delivery vehicle and the current GPS coordinates of the target vehicle can be stored in the one or more cloud based databases. Using the current GPS coordinates of the service delivery vehicle and the current GPS coordinates of the target vehicle, the GPS-based proximity and control module can monitor the distance between the service delivery vehicle and the target vehicle. Using the second cellular communication, the GPS-based proximity and control module in the backend server can send, via the second client device or directly to the installed dongle module, one or more commands to the on-board dongle module of the target vehicle. The commands can include: 1) to wake-up the on-board dongle module in the target vehicle while in a close proximity established by a first threshold distance between the delivery vehicle and the target vehicle, 2) cause the target vehicle to give an alert via any of i) honking a horn, ii) flashing lights of the target vehicle, and iii) activating a security alarm of the target vehicle while in a close proximity established by a second threshold distance between the delivery vehicle and the target vehicle, 3) to unlock or open a door including a trunk of the target vehicle for the service delivery person to perform one or more services, and 4) after establishing a fourth threshold distance between the delivery vehicle and the target vehicle, to lock the doors of the target vehicle.

In an embodiment, a method of geo-proximity access for service delivery to a target vehicle includes a number of example steps. One or more cloud based servers having a first group of one or more processors and one or more cloud-based databases are configured. A GPS-based proximity and control module is executed on the first group of one or more processors. The instructions to ensure a secure access by a service delivery person associated with a service delivery vehicle to the target vehicle is executed. The current GPS coordinates of the target vehicle is received from a first client device associated with the target vehicle. The current GPS coordinates of the service delivery vehicle is received from a second client device associated with the service delivery person. The distance between the service delivery vehicle and the target vehicle is monitored. The on-board dongle module of the target vehicle is woken up when a close proximity by a first threshold distance between the service delivery vehicle and the target vehicle is established. An alert is given by the target vehicle when a close proximity by a second threshold distance between the service delivery vehicle and the target vehicle is established. The target vehicle is unlocked. One or more services are performed by the service delivery person on the target vehicle.

The services can include any of package exchange with the target vehicle, vehicle maintenance to the target vehicle, cleaning the target vehicle, and vehicle repair of the target vehicle. The target vehicle is locked after a fourth threshold distance is established between the service delivery vehicle and the target vehicle.

BRIEF DESCRIPTION OF THE DRAWINGS

The multiple drawings refer to the example embodiments of the design.

Figure 1A:
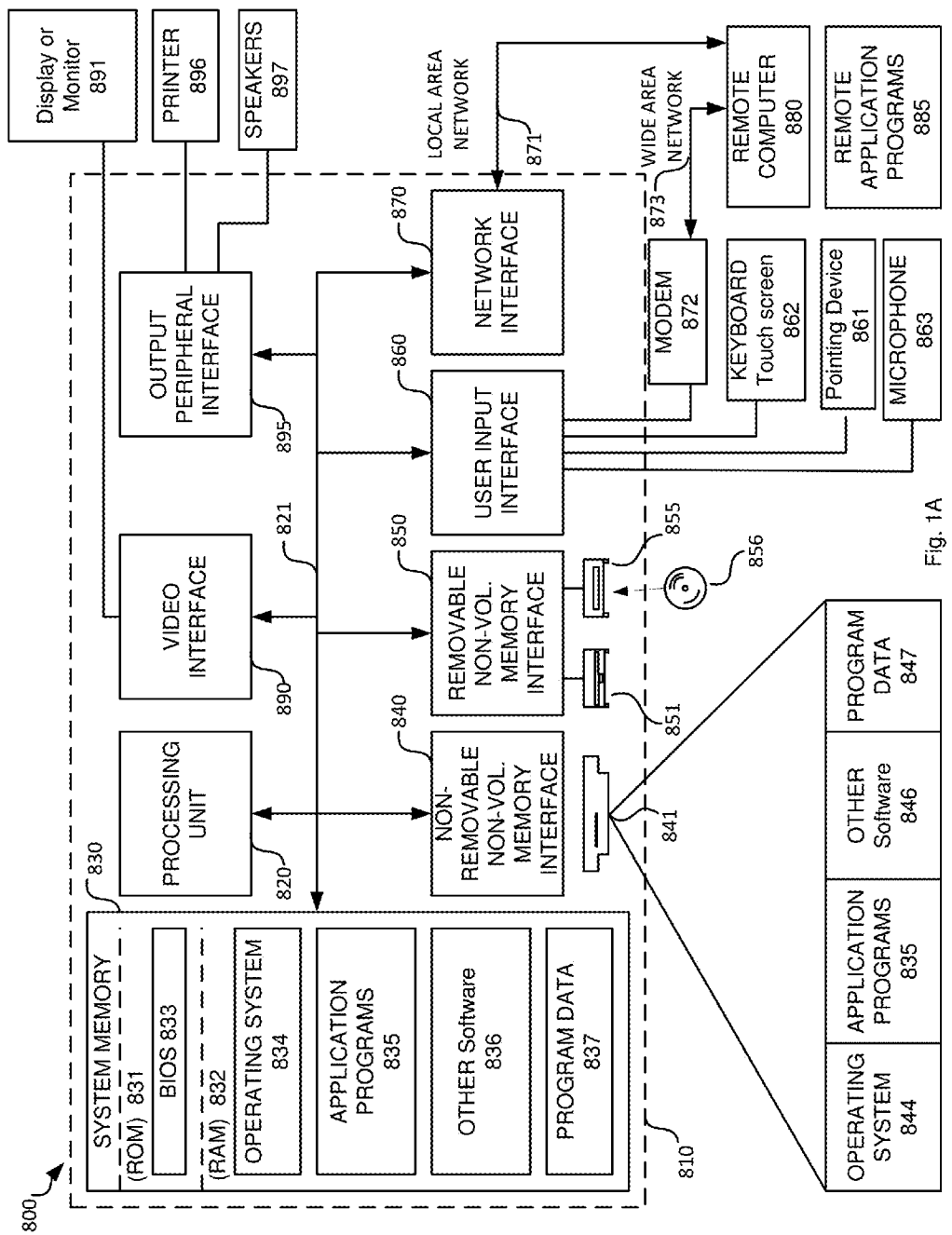
FIG. 1A illustrates a block diagram of an example computing system that may be used in an embodiment of one or more of the servers, in-vehicle electronic modules, and client devices discussed herein.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific package delivery services, named components, connections, number of databases, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely exemplary. The specific details discussed in one embodiment may be reasonably implemented in another embodiment. The specific details may be varied from and still be contemplated to be within the spirit and scope of the present design.

Figure 11:
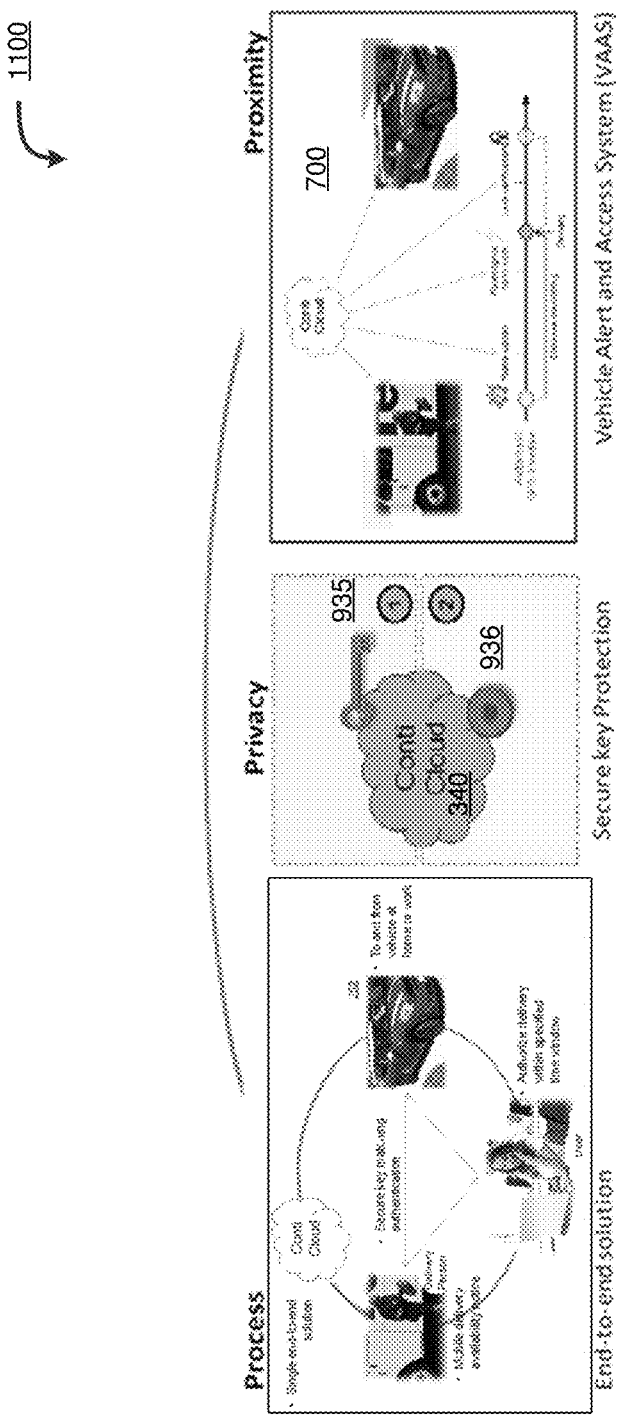
FIG. 11 illustrates a block diagram overview of an embodiment of the system-for-geo-proximity-access hosted on a cloud-based and some of its features including i) built in privacy and security and ii) a vehicle awake and alert system via proximity.

In general, a dongle can be installed in a target vehicle to allow access to a target vehicle by a backend cloud based system for geo-proximity-access and facilitates exchange of packages at home or work. The dongle module can include memory buffers, processors, transceivers, and at least one RF transmitter. A first transmitter in the dongle module can couple, wired or wirelessly, to the on-board diagnostic (OBD) port of the target vehicle and receive diagnostic data of the vehicle. A second transmitter in the dongle module can do either or both of i) use wireless communication, e.g., Bluetooth or Wi-Fi wireless, to communicate with one or more client devices and send data and receive data and commands, or ii) use wireless communication, e.g. cellular communication to communicate and send data and receive data and/or commands from a backend cloud based system. A Radio Frequency (RF) transmitter in the dongle module can transmit RF signals to command a Remote Keyless Entry (RKE) module of the target vehicle. The dongle module can optionally have a GPS chip to receive GPS locating signals and to calculate GPS coordinates of the target vehicle, or, to receive the GPS coordinates of the target vehicle from a client device. The dongle module can optionally include algorithms and data receive learning commands from the backend cloud based system to be taught to become an extra key fob of the target vehicle. The dongle module communicates with a GPS-based proximity and control module of the backend cloud based system to send and receive data and commands. The backend cloud based system may be hosted on a cloud-based provider site. The cloud-based system-for-geo-proximity-access may provide a single common end-to-end solution for the service delivery providers to securely exchange packages to or from a target vehicle or for maintenance providers to provide maintenance to the target vehicle. As described, the end to end solution requires a dongle module to be installed in the target vehicles and also to use one or more application programming interfaces on the cloud based system-for-geo-proximity-access and to use downloadable applications resident on client devices. The communication between the dongle module and the GPS-based proximity and control module of the backend cloud based system can either be i) direct; using cellular communication, or ii) indirect; using Bluetooth or Wi-Fi communication to the client devices and then the client devices using cellular communication to communicate to the GPS-based proximity and control module of the backend cloud based system. The cloud-based system-for-geo-proximity-access may use two or more paired-virtual keys, such as a dual-key protection mechanism, via secure key matching authentication in order to render hacking the backend cloud based system or any of the client devices useless. Additionally, the virtual keys are given a shelf life to limit authorized package delivery and subsequent activation of the dongle module to within a specified time window or a specific location. The first virtual key can be used to authenticate the communications from a client device associated with the service delivery person and the second virtual key can be used to authenticate a customer's request associate with the target vehicle. In general, only encrypted data is transmitted from the cloud-based system-for-geo-proximity-access and the applications resident on client devices. The system-for-geo-proximity-access uses a GPS-based proximity system to control and track the package exchange or service delivery process, to speed up the package or service delivery and pick-up process, and to ensure security for the package exchange or service delivery. The system-for-geo-proximity-access picks up or delivers a package to wherever vehicle is parked, including the service can deliver package to or pick-up package from a rental car while on business trip. (See FIG. 11 for a block diagram overview of an embodiment of the system-for-geo-proximity-access hosted on a cloud-based and some of its features including i) built in privacy and security and ii) a vehicle awake and alert system via proximity). Additionally, the dongle module may be coupled, with wires or wirelessly, to an electro-mechanical activation circuit coupled a trunk or a lock of the target vehicle such that the electro-mechanical activation circuit can receive commands from the dongle module to open a trunk or unlock doors of the target vehicle.

Example processes for and apparatuses to provide an automated process workflow for the entire cloud-based system-for-geo-proximity-access are described. The following drawings and text describe various example implementations of the design. FIG. 1A and FIGS. 2A-2C illustrate example environments to implement the concepts.

The cloud-based system-for-geo-proximity-access can be implemented in software, hardware electronics, and any combination of both and when one or more portions of the system are implemented in software, then that software is tangibly stored in an executable format on the one or more non-transitory storage mediums to be executed by a processing component.

Figure 1B:
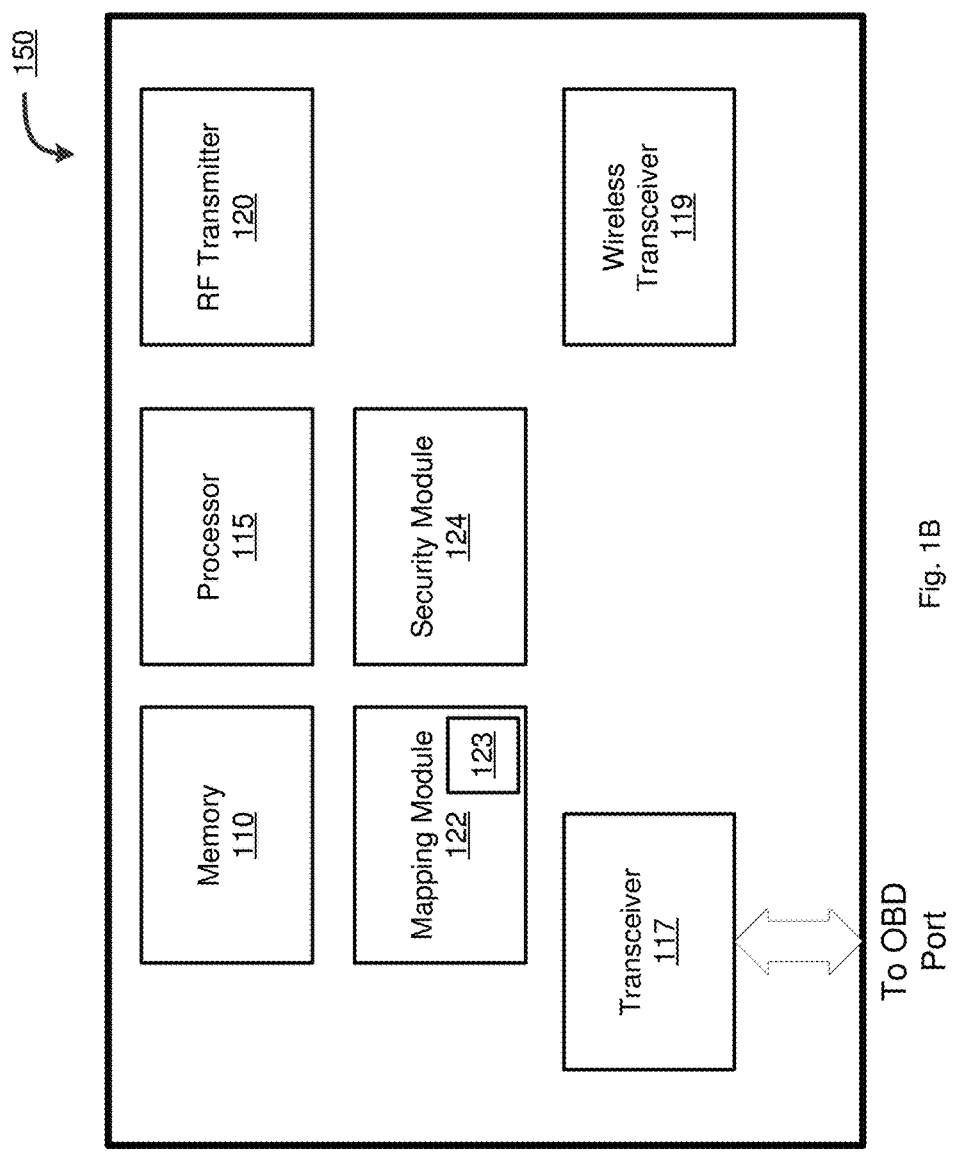
FIG. 1B-1C illustrates a block diagram and a table describing modules of an example dongle module that may be installed in a vehicle.
Figure 1C:
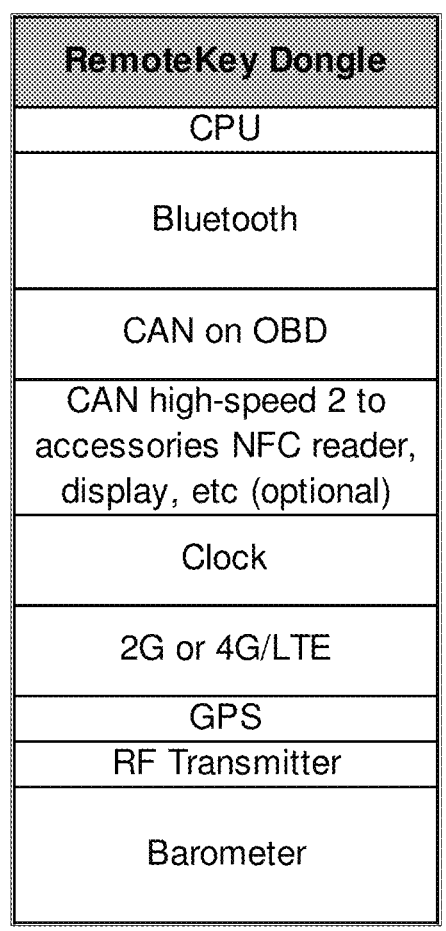

FIG. 1B illustrates a block diagram of an example dongle module that may be installed in a vehicle. The dongle module can include memory buffers 110 and processors 115. The dongle module can also have two or more transceivers including a wireless transceiver 119 as well as a transceiver 117 that can communicate with the OBD port of the vehicle. The dongle module has and RF transmitter 120 that can transmit RF signals to the RKE module of the vehicle. The dongle module further includes a mapping module 122 that can have a GPS chip 123 as well as a security module 124.

Thus, the dongle module 150 that can be installed in a vehicle can include one or more memory buffers 110, one or more processors 115. The dongle module 150 also includes a first transceiver 117 that can be couple to an on-board diagnostic (OBD) port of the vehicle and to communicate with a fault and diagnostic module of the vehicle. The dongle module 150 also has a second transceiver 119 that can use wireless communications to communicate with one or more client devices, a first client device and a second client device. The dongle module 150 further includes a Radio Frequency (RF) transmitter 120 that can transmit RF signals to command a Remote Keyless Entry (RKE) module of the vehicle.

A mapping module 122 of the dongle module 150 can include a first map calculating chip 123 to receive map locating signals and to calculate map coordinates of the vehicle. Alternatively, the mapping module 122 of the dongle module 150 can periodically request from the first client device, via the second transceiver 119, the map coordinates of the vehicle. The mapping module 122 of the dongle module 150 can store the Global Positioning Satellite map coordinates of the vehicle in the one or more memory buffers 110. The mapping module can send map coordinates of the vehicle to a backend cloud based server.

A security module 124 of the dongle module 150 can receive, via the second transceiver 119, a current rolling security key of the RKE module of the vehicle from the second client device. Alternatively, the security module 124 of the dongle module 150 can receive, via the second transceiver 119, a first algorithm and a first data from the second client device. The first algorithm can be implemented in a first routine of the security module 124 that runs on the one or more processors 115. The first algorithm can use the first data to determine the current rolling security key of the RKE module of the vehicle. The dongle module 150 can store the current rolling security key of the RKE module of the vehicle in the one or more memory buffers 110.

Additionally, the security module 124 can receive from the second client device, via the second transceiver, one or more commands including a first command. The security module 124 can send the first command and the current rolling security key to the RKE module through commanding the RF transmitter to transmit RF signals to the RKE module of the vehicle. The transmitted RF signals can include the received first command and the current rolling security key. Also, the RKE module of the vehicle can validate the current rolling security key and then execute the first command.

In an embodiment, the security module 124 of the on-board dongle module 150 can receive learning commands from an automated program in the GPS-based proximity and control module of cloud based servers 340 outside the target vehicle 252. The command can be used for teaching the on-board dongle module to become a key fob. The on-board dongle module 150 can further be registered and validated as a key fob with the RKE module of the target vehicle.

High Level Description of Each Transaction in Case of Dongle Solution

Figure 3A:
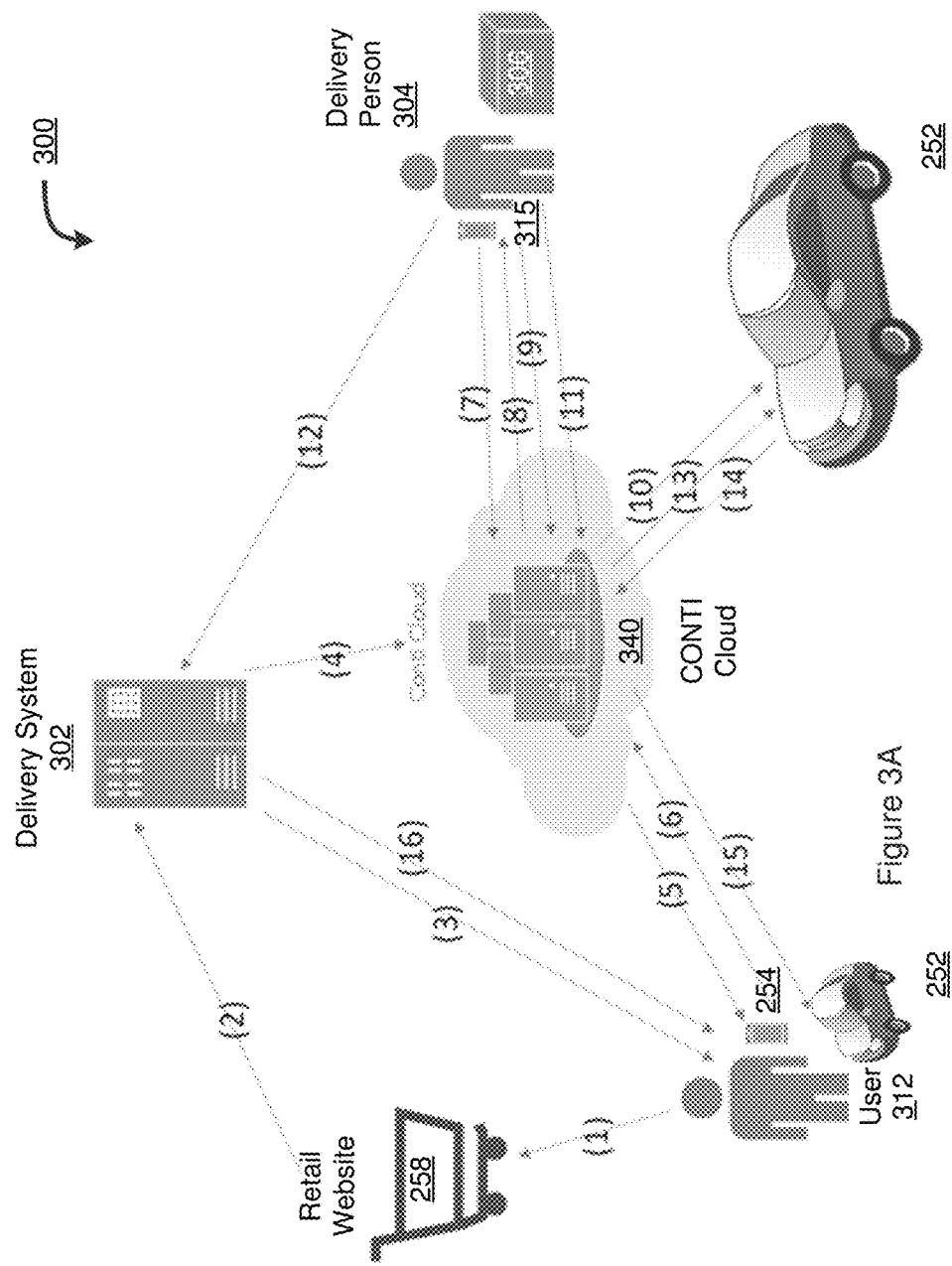
FIGS. 3A-3C illustrate block and flow diagrams of an embodiment of the alternative delivery system using a dongle solution.
Figure 3B:
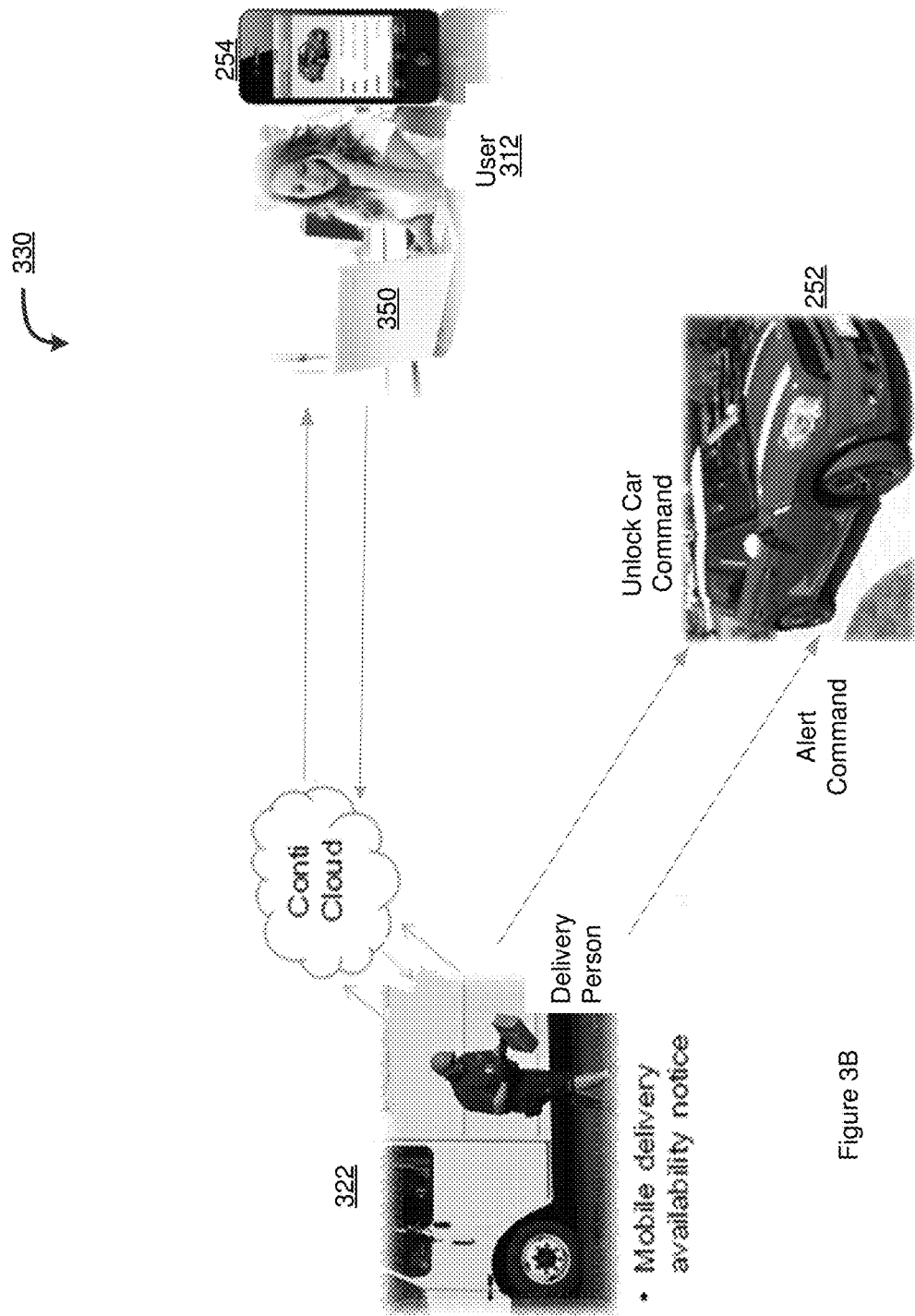
Figure 3C:
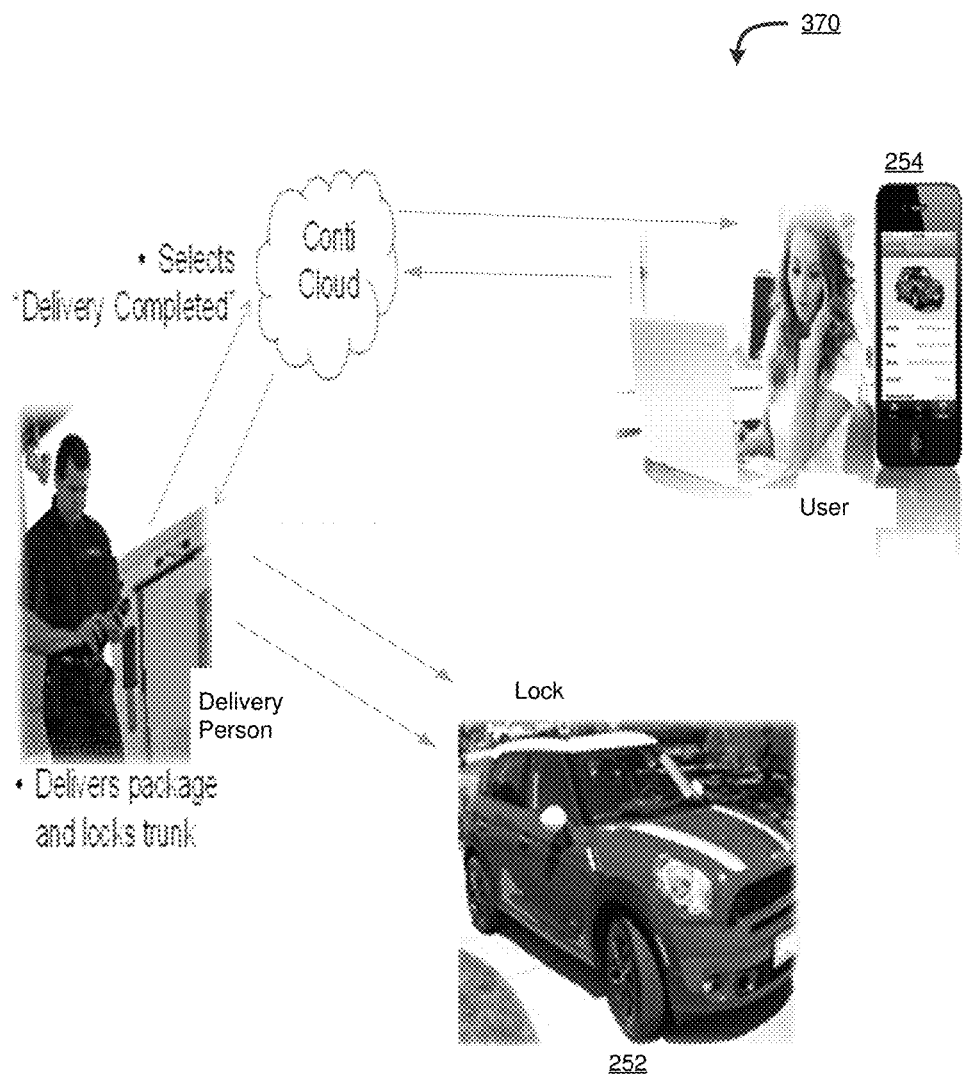

FIGS. 3A-3C illustrate block and flow diagrams of embodiments of the alternative delivery system using a dongle solution. FIG. 3A illustrates a flow diagram 300 of an embodiment of the alternative package pickup and delivery system using an example dongle solution including sequence of steps.

In an embodiment, a dongle module including a software application can provide a new intelligence using a vehicle's navigation system and/or coordinates. The application in the dongle module leads the way to an intelligent and expanded use of navigation data to control other vehicle systems. Additional hardware may be installed in the target vehicle to assist in the service and/or package exchange operation. The dongle module may be a small piece of hardware that attaches to the vehicle in order to enable additional functions.

Figure 5:
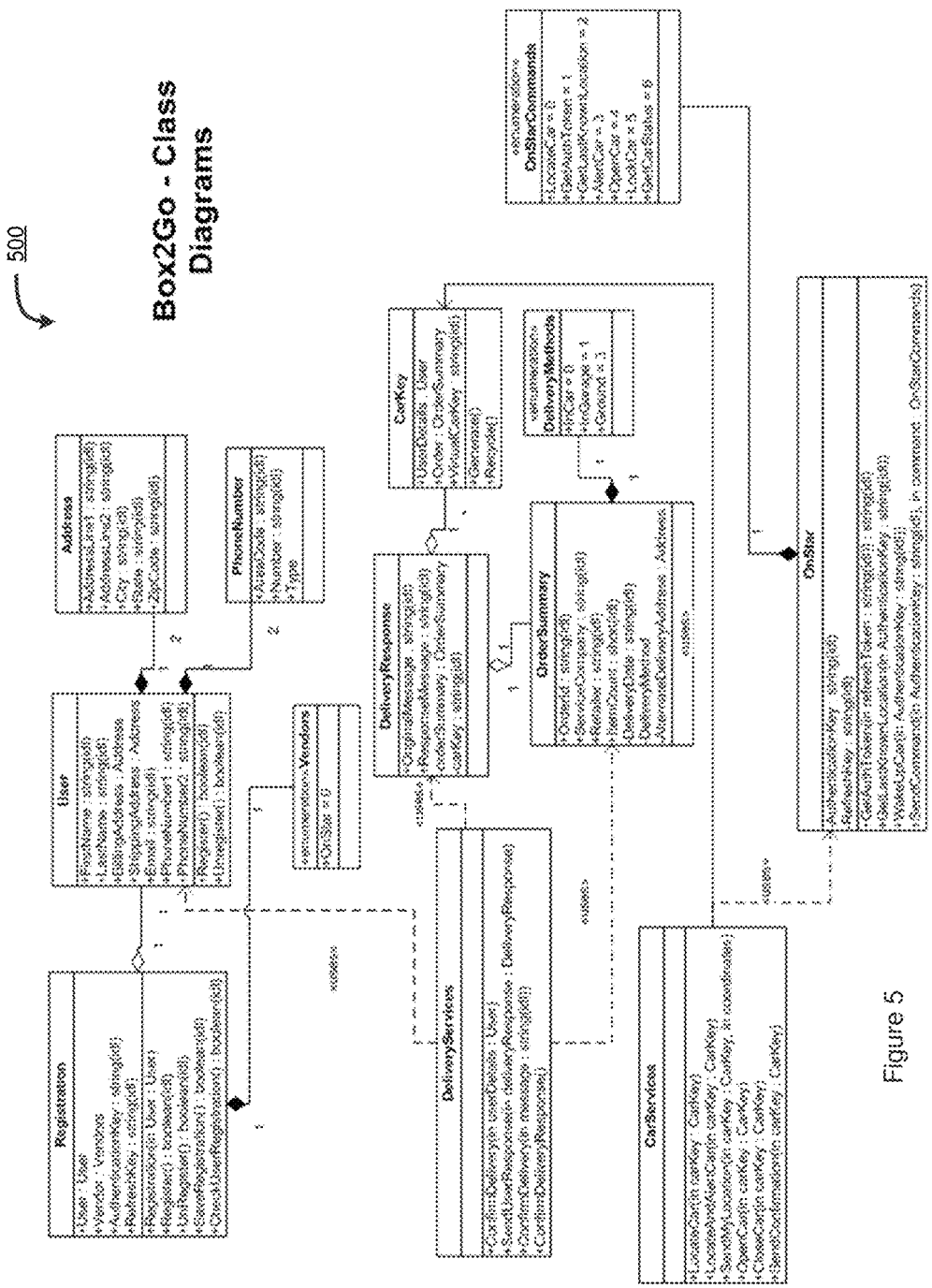
FIG. 5 illustrates an example class diagram of an embodiment of an application programming interface for the alternative package pickup and delivery system.

An alternative package pickup and delivery system is discussed. The system includes a cloud-based package exchange with a vehicle service that is hosted on a cloud-based provider site, one or more package delivery entity systems, such as FedEx™, having both a package delivery website as well as one or more package delivery vehicles with client devices having a delivery application resident in each client device. The cloud based system-for-geo-proximity-access to a vehicle is configured to have Wi-Fi or cellular communications to the dongle module in order to exchange information including GPS coordinates of the vehicle and to cause electromechanical actions within that vehicle including: unlocking doors, opening windows, opening trunks, closing trunks, turning engine on, turning engine off, opening and closing a sunroof or moon roof. The cloud-based system-for-geo-proximity-access is hosted on a cloud-based provider site that contains one or more servers and one or more databases. The cloud based system-for-geo-proximity-access to a vehicle is coded to utilize a protocol, including HTTP, to engage in a request and response cycle with either i) a mobile device application resident on a client device of the user, ii) a web-browser application resident on the client device of the user/customer, or iii) both. The cloud-based system-for-geo-proximity-access has one or more routines to automate the package delivery. The cloud-based system-for-geo-proximity-access to a vehicle has one or more open application programming interfaces to standardly exchange information between the two or more package delivery entity systems. (See FIG. 5 for an example class diagram of an embodiment of an application programming interface for the alternative package delivery method.) A hardware module, such as a dongle module, in the vehicle then causes electromechanical actions within that given vehicle in order to allow the cloud based system-for-geo-proximity-access to a vehicle to access a plurality of different kinds of vehicles, manufactured from a number of different manufactures. An example dongle module may cooperate with or be part of a navigation system in the vehicle. The cloud-based system-for-geo-proximity-access to a vehicle has a Global Positioning System (GPS) based proximity and control module scripted to establish a communication link with a communication terminal of the package delivery entity systems sites via a communication network. The GPS-based proximity and control module of the cloud-based system-for-geo-proximity-access to a vehicle is also scripted to exchange information with a delivery application on a client device in order to send or receive information from a package delivery person. The GPS-based proximity and control module of the cloud-based system-for-geo-proximity-access to a vehicle can communicate to a user of the target vehicle having a package delivered to that vehicle, which is scripted to exchange information with a mobile application or desktop application on a client device of the user/customer. The vehicles include but are not limited to automobiles, trucks, vans, motorcycles, and other similar transportation mechanisms.

(1) The User 312 either uses a mobile device 254 application on their client device (e.g., a mobile phone) or accesses a retailer's website via a browser on a desktop application 350 on their client device. The retailer's website collects order information including the products selected. The client device submits order and shipping information via the mobile application to the retailer's website, and in the case of delivering to a vehicle, the order includes the vehicle VIN. The user interface of the retailer's website offers the alternative delivery destination of the consumer's/user's vehicle 252 as a delivery destination. Note, the retailer's website user interface may show the alternative delivery destination of the consumer's/user's vehicle and an additional monetary charge may be associated with this alternative delivery destination. The additional monetary charge may be charged on a per delivery instance basis or based on a subscription basis.

(2) The retailer's website 258 sends shipping information to the package-delivery-entity-system 302, such as FedEx. The shipping data can include the customer/user data.

(3) The package-delivery-entity-system 302 sends confirmation including Tracking Number to the User/customer 312 on their client device 254 or 350 applications. FIG. 3A shows the mobile 254 application on a mobile device of the user 312.

(4) The package-delivery-entity-system 302 sends a notification to the cloud based system-for-geo-proximity-access 340, including Tracking Number and VIN via the standardized open application programming interface. The notification including the shipping Tracking Number and VIN are stored in the databases 275 of the cloud-based system-for-geo-proximity-access to a vehicle 340.

(5) The cloud based system-for-geo-proximity-access to a vehicle 340 sends a notification to either the mobile 254 application or the desktop 350 application on their client device and confirms with the User their desire to have a package shipped to their vehicle with the Tracking Number and VIN for the package delivery. The confirmation notice also acts as a security mechanism to ensure that the user did in fact elect to have a package delivered to their vehicle 252.

(6) After the first notification, the User can supply a response into either the mobile application or the desktop application on their client device to send permission to the cloud based system-for-geo-proximity-access to a vehicle. In response to the second notification, the user may supply a second confirmation including a virtual key or a security token of the vehicle. The cloud-based system-for-geo-proximity-access to a vehicle has a multiple phase, such as a two-phase, verification mechanism involving two security keys. The cloud-based infrastructure is scripted to validate authorization for the package delivery to a registered owner's vehicle. The source of initiating the request to open up the car is verified twice as the first virtual key coming along with a request from a package delivery system or a package delivery vehicle associated with the package delivery system is verified. Also, a second car actuation security token, such as a second virtual key, is coming from the client device associated with the user. The second virtual key can be a rolling security key of a Remote Keyless Entry (RKE) module of the target vehicle of the customer. (See FIGS. 9A-9D on block diagrams of embodiments of the multiple paired virtual keys and security authorization notices used by the package-transfer-service.)

(7) After the package arrives in the same city, the package delivery entity system's delivery person 304 uses the package delivery application 315 in their client device to send the Tracking Number to the package exchange with a vehicle service in order to obtain the vehicle's information including its current location information. FIG. 3A shows a package delivery application 315 on the client device of the delivery person 304.

Upon approaching the target vehicle, an application in the client device of the package delivery person can send a request to the cloud based system-for-geo-proximity-access to a vehicle to wake up the dongle module of the target vehicle by either automatically detecting a close proximity by the first threshold distance between the package delivery vehicle and the target vehicle or can be prompted by the package delivery person to send the request. Alternatively, the distance between the package delivery vehicle and the target vehicle can independently be monitored by the cloud-based system-for-geo-proximity-access to a vehicle and the request can be sent without package delivery person's involvement. The dongle module may be in a sleep-mode as this prevents battery drain when vehicle is not in use and thus the dongle module needs to be sent a wake up notice. The cloud-based system-for-geo-proximity-access to a vehicle via the one or more application programming interfaces sends one or more wake up requests to the dongle module to wake up the vehicle. Alternatively, the GPS-based proximity and control module in the cloud-based system-for-geo-proximity-access to a vehicle can calculate the distance between the delivery vehicle and the target vehicle and send the wake up message. In an embodiment, the wake up message can be initiated either manually by the package delivery person, or automatically by the GPS-based proximity and control module in the cloud based system-for-geo-proximity-access to a vehicle. In an example, the dongle module may not drain battery power or may drain very little battery power thus may not go to sleep. In such case, the waking up step can be omitted (8) After step (6), the cloud-based system-for-geo-proximity-access to a vehicle has tracked the vehicle's location and sends it out upon a request from the package delivery person.

Additionally, the distance between the GPS coordinates of the package delivery vehicle having a delivery application resident in a client device in the delivery vehicle and the target vehicle's GPS coordinates as periodically received from the dongle module is monitored and compared by the GPS-based proximity and control module in the cloud based system-for-geo-proximity-access to a vehicle.

(9) After the package delivery entity system's delivery person approaches the vehicle, a request is sent to the cloud-based system-for-geo-proximity-access to a vehicle to blink the hazard lights and open the trunk.

Figure 7A:
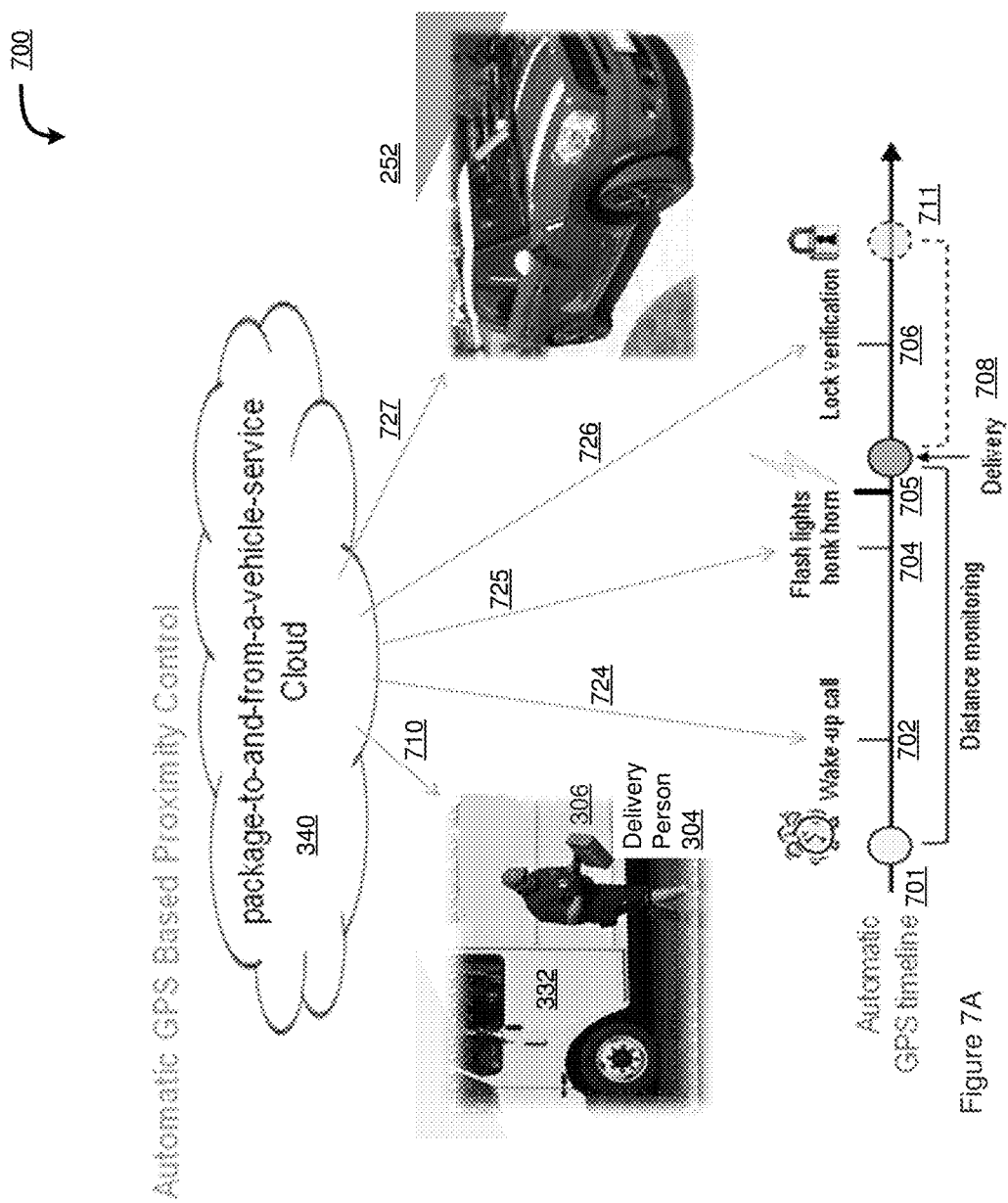
FIGS. 7A and 7B illustrate block and flow diagrams of embodiments of the GPS-based control and tracking mechanisms used for delivery to or pick-up from the vehicle.

The GPS-based proximity and control module in the cloud based system-for-geo-proximity-access to a vehicle will also send a request via the one or more application programming interfaces to the dongle module to cause a localized alert in the target vehicle so that the vehicle can blink the vehicle's lights and honk its horn to alert the package delivery person directly to the target vehicle's location (see, for example, FIG. 7A), in order to save time and aid in locating the target vehicle within rows of parked cars. Alternatively, the request can be initiated by the client device of the package delivery vehicle or the client device of the package delivery person. This ensures the designated target vehicle is identified properly and increases efficiency of delivering the package.

(10) The cloud-based system-for-geo-proximity-access to a vehicle verifies the request and send the commands that blinks the hazard lights and/or unlocks the target vehicle including the trunk.

As discussed, before sending the functional commands including lock/unlock doors and give an alert to the target vehicle of the customer, the GPS-based proximity and control module in the cloud based system-for-geo-proximity-access to a vehicle receives at least two virtual verification keys, a first virtual verification key from the client device associated with the package delivery vehicle and a second virtual verification key from the client device associated with the customer. The first virtual verification key can be given a first shelf life and the second virtual verification key can be given a second shelf life such that sending of the functional commands stay within an overlap window of time between the first shelf life and the second shelf life.

Optionally, the GPS-based proximity and control module waits for a confirmation from the delivery application that the package delivery person has located the target vehicle. Then the GPS-based proximity and control module composes a correct request command and sends the request via the one or more application programming interfaces to the dongle module in the vehicle to open the trunk of the vehicle or some other electro-mechanical actuation of a window or sunroof of the vehicle.

(11) After placing the package in the target vehicle, e.g., a trunk of the target vehicle, and closing the doors including the trunk, the package delivery entity system's delivery person sends a delivery completion confirmation to the cloud based system for geo-proximity-access to a vehicle. Alternatively, the package delivery person instead of placing a package may retrieve a package from the target vehicle.

(12) The package delivery entity system's delivery person 304 optionally sends a confirmation to the package delivery entity system 302.

(13) After (11), the cloud based system-for-geo-proximity-access to a vehicle polls the status of the vehicle. In fact, after receiving a confirmation of the completion of package transfer from the package delivery application in the package delivery person's client device, the GPS-based proximity module in the cloud based system-for-geo-proximity-access to a vehicle can receive GPS coordinates from the package delivery application in the package delivery person's client device and resume monitoring the package delivery vehicle. The GPS-based proximity and control module performs distance monitoring to recognize when the package delivery person is departing and then is scripted to verify that the target vehicle is locked and to avoid the package delivery person leaving an unlocked vehicle. The cloud based system-for-geo-proximity-access to a vehicle polls the lock status of the target vehicle by sending a request to the dongle module.

(14) Dongle responds with the lock door status (open/closed). If door lock status is not confirmed locked, the GPS-based proximity module in the cloud based system-for-geo-proximity-access to a vehicle sends a request via the one or more application programming interfaces to the dongle module in the vehicle to close and lock the vehicle's doors/trunk. This feature improves security to insure the vehicle is locked after departure and is not left unlocked.

Note, the onboard dongle module in the target vehicle of the customer can be configured to communicate with the GPS-based proximity and control module of the cloud based system-for-geo-proximity-access to a vehicle through the Wi-Fi or cellular communications to receive the functional (electro-mechanical) commands including lock/unlock doors, give an alert, and turn engine on/off. The dongle module can have a key fob simulator such that it can include an RF circuitry of a key fob and can be configured to perform the functional (electro-mechanical) commands by transmitting RF signals that include the functional commands to a RKE module of the target vehicle of the customer.

The GPS-based proximity and control module is scripted to perform multiple actions via the dongle module including i) waking up a vehicle, ii) facilitating for the electro mechanical operations in the vehicle to occur, such as unlocking/locking doors, opening/closing windows, opening and unlocking/closing and locking a trunk, opening/closing sunroof, and iii) detecting when the package delivery vehicle is at a certain distance away from the target vehicle, then the vehicle should become secure at that point.

(15) The cloud-based system-for-geo-proximity-access to a vehicle sends a delivery confirmation notice to the User.

(16) The package delivery entity system 302 sends delivery confirmation email to the User.

As described, the dongle module can have a key fob simulator such that it has a circuitry including the RF circuitry of a key fob and additionally is capable of executing an algorithm to generate rolling security keys of the RKE module. The dongle module can be taught as an extra key fob. The teaching of the dongle module as an extra key fob can be automated and performed by receiving commands via Wi-Fi or cellular communications from the GPS-based proximity and control module of the cloud based system-for-geo-proximity-access to a vehicle. After being taught, the current rolling security key can be stored in the dongle module. Upon receiving the functional (electro-mechanical) commands the dongle module can generate the next rolling security key based on the current rolling security key to be transmitted along with the functional commands to the RKE module.

Alternatively, in an example (e.g., for security reasons), the current rolling security key may not be stored in the dongle module and can be transmitted to the cloud based system-for-geo-proximity-access and/or transmitted to a client device of the user and can be stored in the client device of the user and/or stored in a database associated with the cloud based system-for-geo-proximity-access to a vehicle such that the GPS-based proximity and control module of the cloud based system-for-geo-proximity-access to a vehicle sends the functional command and the stored rolling security key to the dongle module. Upon receiving the functional commands and the rolling security key, the dongle module generates the next rolling security key based on the current rolling security key to be transmitted along with the functional commands to the RKE module. In an example, the next rolling security key can be generated by the GPS-based proximity and control module of the cloud based system-for-geo-proximity-access such that the GPS-based proximity and control module of the cloud based system-for-geo-proximity-access to a vehicle sends the functional command and the next rolling security key to the dongle module to be transmitted along with the functional commands to the RKE module.

In an example, the dongle module can transmit (e.g., using Bluetooth) the current rolling security key of the RKE module to a client device of the user, which the user can transmit the current security key as the security token to the GPS-based proximity and control module of the cloud based system-for-geo-proximity-access to be used for verification of the user and target vehicle.

In an embodiment, the actuation module of the target vehicle is a dongle module. In an example, when a rolling security key of the Body Control Module is generated, the (current) rolling security key is transmitted to the cloud based system to be stored in a Box2Go account corresponding to the user and the target vehicle. The generated current rolling security key is also transmitted to the client device of the user. When a user requests a delivery to the target vehicle, then the current rolling security key is sent by the client device of the user to the cloud based system, the rolling security key is matched with the rolling security keys in Box2Go accounts of the cloud-based system for user and target vehicle verification. The commands sent by the cloud based system also includes the current rolling security key, which can be matched with by the dongle module with its rolling security key for authentication of the commands. The current rolling security key of the Body Control Module can be assigned a shelf life by the cloud-based system.

In the dongle module 150, Wi-Fi or Bluetooth communications can be used to communicate between the second transceiver 119 and the one or more client devices. As an example, the client devices can be smart phones. In an example, the first client device, e.g., client device 254 in FIGS. 3A-3C, 4A, and 4B is located inside or in a vicinity of the vehicle 252 such that the map coordinates of the vehicle 252 and map coordinates of the first client device 254 are essentially equal.

As an example, the first client device associated with the target vehicle is located inside or in a vicinity of the target vehicle such that the GPS coordinates of the target vehicle and GPS coordinates of the first client device are essentially the same.

In an embodiment, the first client device 254 can have a second map calculating chip that can receive the map locating signals and can calculate the map coordinates of the client device 254. In response to a mapping module's request, the first client device 254 is configured to periodically send the map coordinates of the first client device, via the second transceiver 119, to the mapping module 122 of the dongle module 150.

Figure 4A:
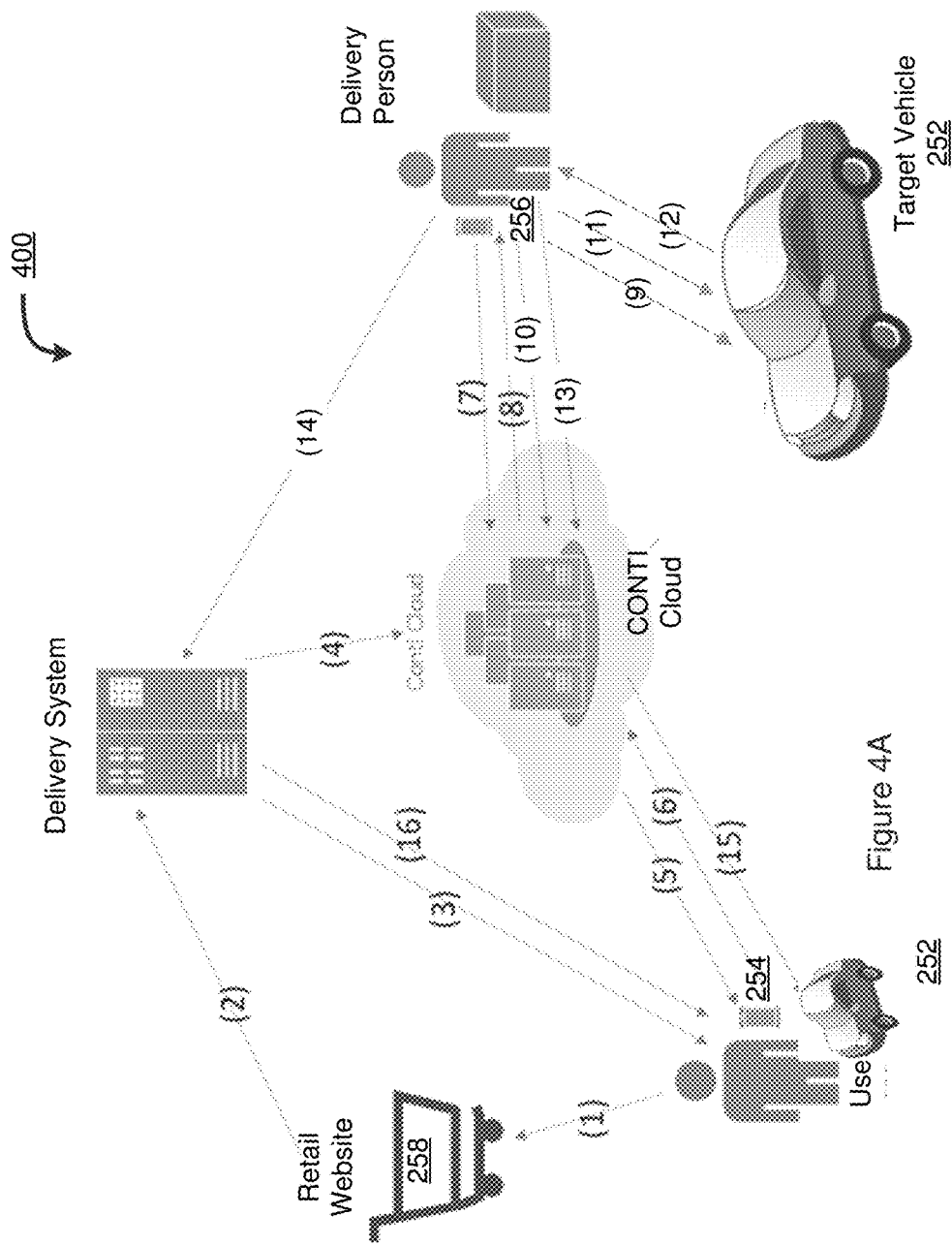
FIG. 4A illustrates a flow diagram of an embodiment of the alternative package pickup and delivery system using an example dongle in the vehicle.
Figure 4B:
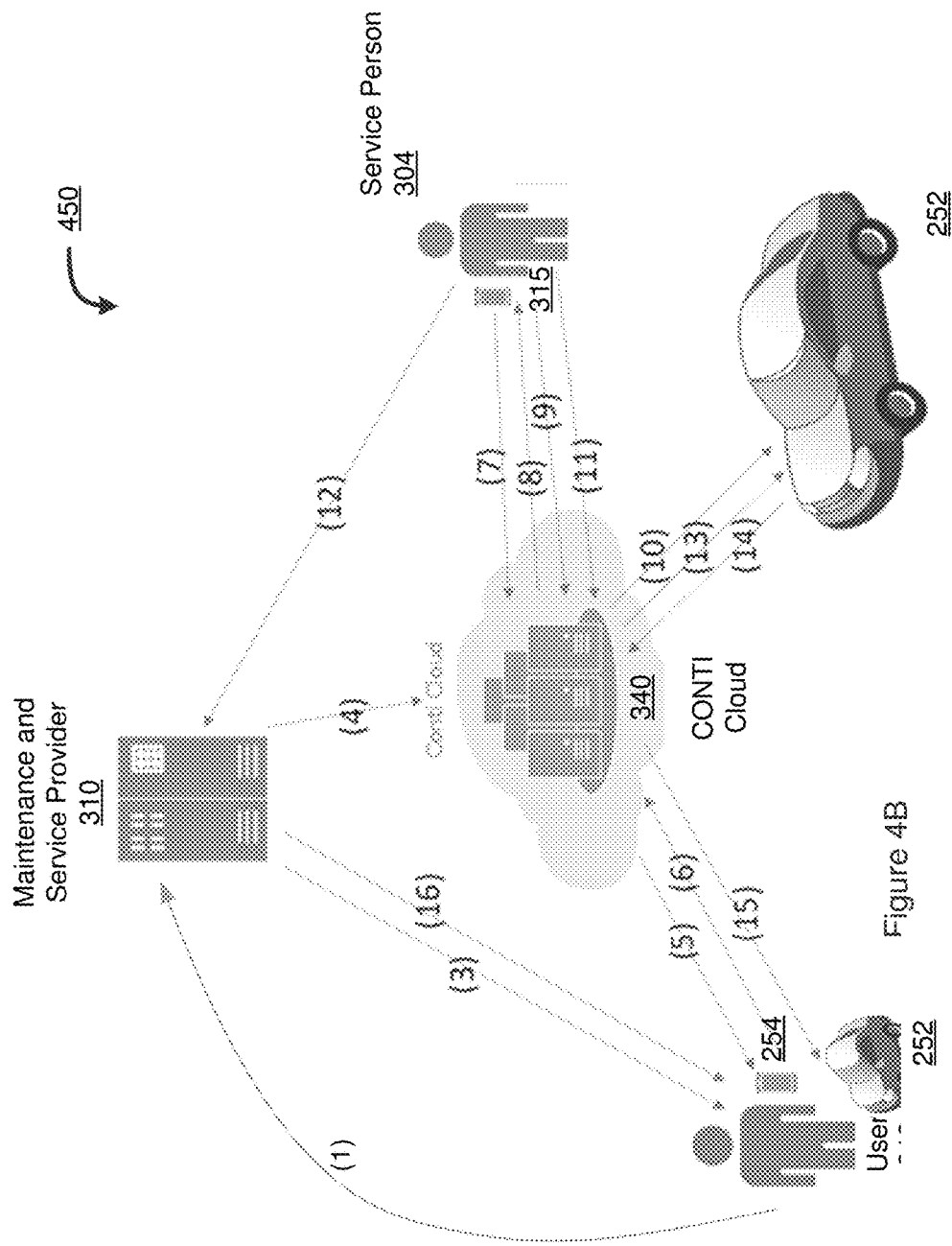
FIG. 4B illustrates a flow diagram of an embodiment of the alternative on-site maintenance using an example dongle in the vehicle.

Additionally, the second client device, e.g., client device 315 in FIGS. 3A, 4A, and 4B, can use cellular communication to communicate with a backend cloud based system 340 having one or servers and one or more databases to receive the current rolling security key of the RKE module of the vehicle 252 from the backend cloud based system 340. The current rolling security key is determined by implementing the first algorithm and using the first data in a second routine running on processors of the backend cloud based system 340. Then the second client device 315 sends the current rolling security key, via the second transceiver 119, to the security module 124. Alternatively, the second client device 315 can use cellular communication to communicate with a backend cloud based system 340 to receive the first algorithm and the first data from the backend cloud based system 340. Then the second client device 315 sends the first algorithm and the first data, via the second transceiver 119, to the security module 124, where the security module determines the current rolling security key of the RKE module by implementing the first algorithm on the servers of the dongle module 150.

In an embodiment, the second transceiver 119 is configured to bypass the client devices 254 or 315 and use cellular communication to directly communicate with the backend cloud based system 340. As an example, the security module 124 directly receives the current rolling security key of the RKE module of the vehicle 252 from the backend cloud based system 340. The current rolling security key is determined by implementing the first algorithm and using the first data in the second routine running on the processors of the backend cloud based system 340. Alternatively, the security module 124 directly receives the first algorithm and the first data from the backend cloud based system 340 and the security module 124 determine the current rolling security key of the RKE module of the vehicle 252 by implementing the first algorithm and using the first data in the first routine running on the one or more processors 115 of the dongle module 150. The current rolling security key of the RKE module of the vehicle 252 can be stored in the one or more memory buffers 110 of the dongle module.

In an embodiment, the mapping module 122 can request from the first client device 254 the map coordinates of the first client device when the vehicle 252 is turned off or when the vehicle 252 is locked. The map coordinates of the first client device 254 can be stored as the map coordinates of the vehicle 252 in the one or more memory buffers 110 of the dongle module 150.

FIG. 4A illustrates a flow diagram of an embodiment of the alternative package pickup and delivery system using an example dongle in the vehicle. The dongle module uses Wi-Fi or Bluetooth to communicate to client devices. The client devices then use cellular communication to communicate with the GPS-based proximity and control module of the cloud based system-for-geo-proximity-access.

FIG. 4B illustrates a flow diagram of an embodiment of the alternative on-site maintenance using an example dongle in the vehicle. With the exception that step (2) is omitted in FIG. 4B, the steps in FIG. 4B are the same as the steps in FIG. 3A and the GPS-based proximity and control module in the cloud based system-for-geo-proximity-access sends commands to the target vehicle to perform action such as unlocking/locking doors, opening/closing windows, opening and unlocking/closing and locking a trunk, opening/closing sunroof of the target vehicle such that a maintenance person can perform maintenance operations. Step (2) is omitted in FIG. 4B because, as an example, the maintenance and service provider 310 has a website for a customer to select on-site maintenance, and additionally the maintenance and service provider also sends the service vehicle to perform the on-site maintenance.

In an embodiment, the first transceiver 117 is configured to receive displacement data including velocity of the vehicle from the OBD port of the vehicle 252. The mapping module 122 couples to the first transceiver 117 and periodically receives and stores the displacement data in the one or more memory buffers 110 of the dongle module. As an example, when the map locating signals are not available, the mapping module 122 can retrieve the last known map coordinates of the vehicle 252 from the memory buffers 110 and also retrieve the displacement data since the last time the known map coordinates were calculated from the memory buffers 110. Then the mapping module 122 can use the last known map coordinates and the displacement data and calculates current map coordinates of the vehicle 252.

In an embodiment, the map locating signals are Global Positioning System (GPS) signals, and the map coordinates are GPS coordinates. The first map calculating chip can receive the GPS signals and determine the GPS coordinates of the target vehicle 252. Also, the second map calculating chip can receive the GPS signals and determine the GPS coordinates of the first client device 254.

Additionally, the dongle module 150 can include a barometer configured to measure a height of the vehicle. The mapping module 150 can receive barometer data and translate the height into levels of building. In an example, the GPS coordinates of the vehicle includes a number of levels up or down relative to ground.

In an embodiment, the security module 124 has two or more algorithms or can cooperate with the databases of the backend cloud based system for downloading the two or more algorithms from the backend servers 340. The algorithms can calculate valid rolling security keys of the RKE modules associated with two or more different types of vehicle.

Also, the security module 124 can receive, via the second transceiver 119, a current rolling security key of the RKE module of one of the two or more different types of vehicles. Alternatively, the security module 124 can receive an algorithm and data for determining the current rolling security key of the RKE module of one of the two or more different types of vehicles.

In an embodiment, the system for geo-proximity access to a target vehicle 252 can include an electro-mechanical activation circuit coupled a trunk or a lock of the target vehicle and configured to open a trunk or unlock doors. The security module 124 of the on-board dongle module 150 can receive, via the second transceiver 119, an open trunk or unlock doors command from the cloud based GPS-based proximity and control module, where in response, the security module 124 of the dongle module 150 can send a signal to the electro-mechanical circuit to open the trunk or unlock the target vehicle. In an example, the connection between the dongle module 150 and electro-mechanical activation circuit is a wired connection. In another example, the connection between the dongle module 150 and electro-mechanical activation circuit is through wireless communications. Also, this embodiment can be installed on a rental car.

High Level Description of the System-for-Geo-Proximity-Access Processes

Figure 6A:
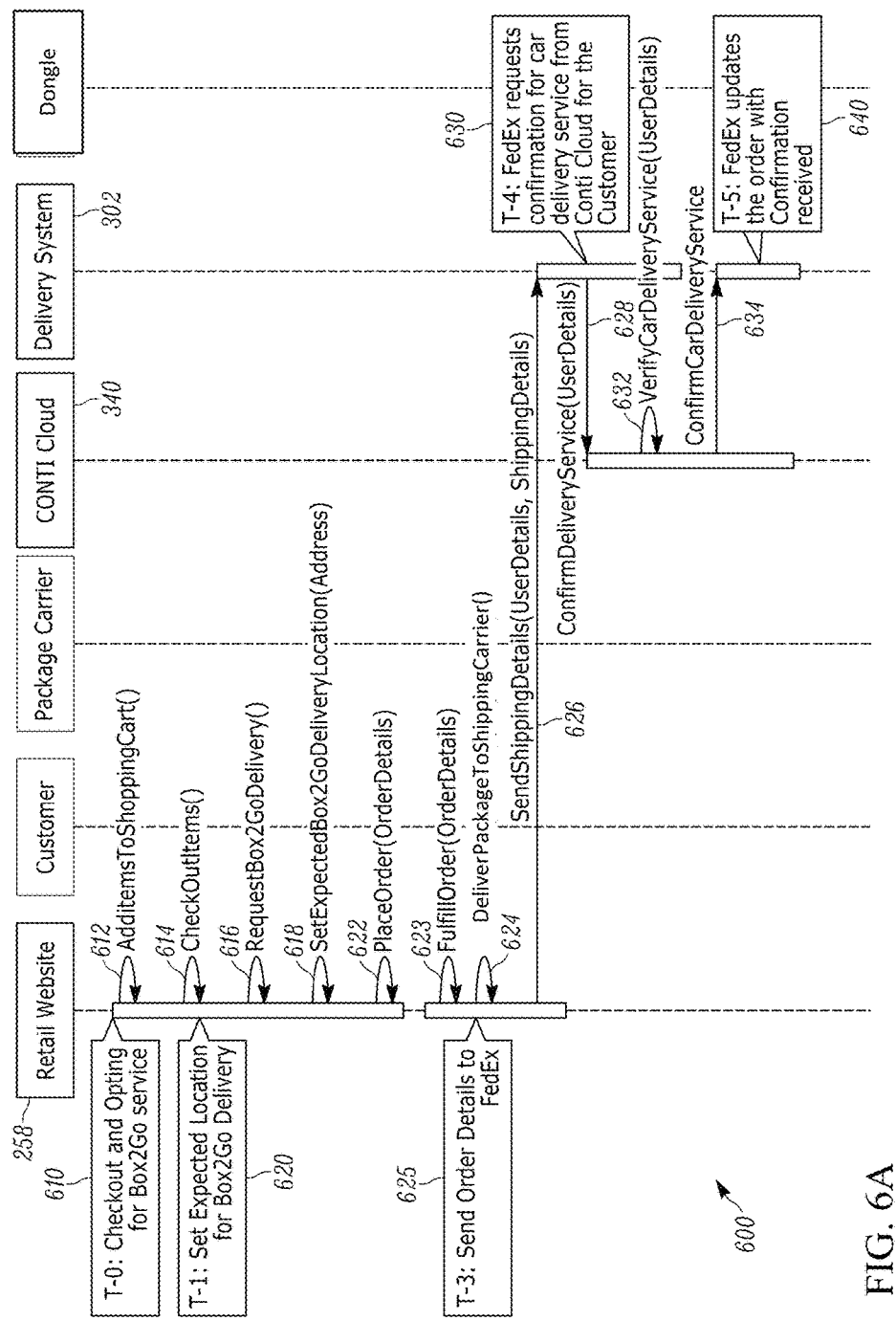
FIGS. 6A-6B illustrate flow diagrams of embodiment of the alternative delivery system.
Figure 6B:
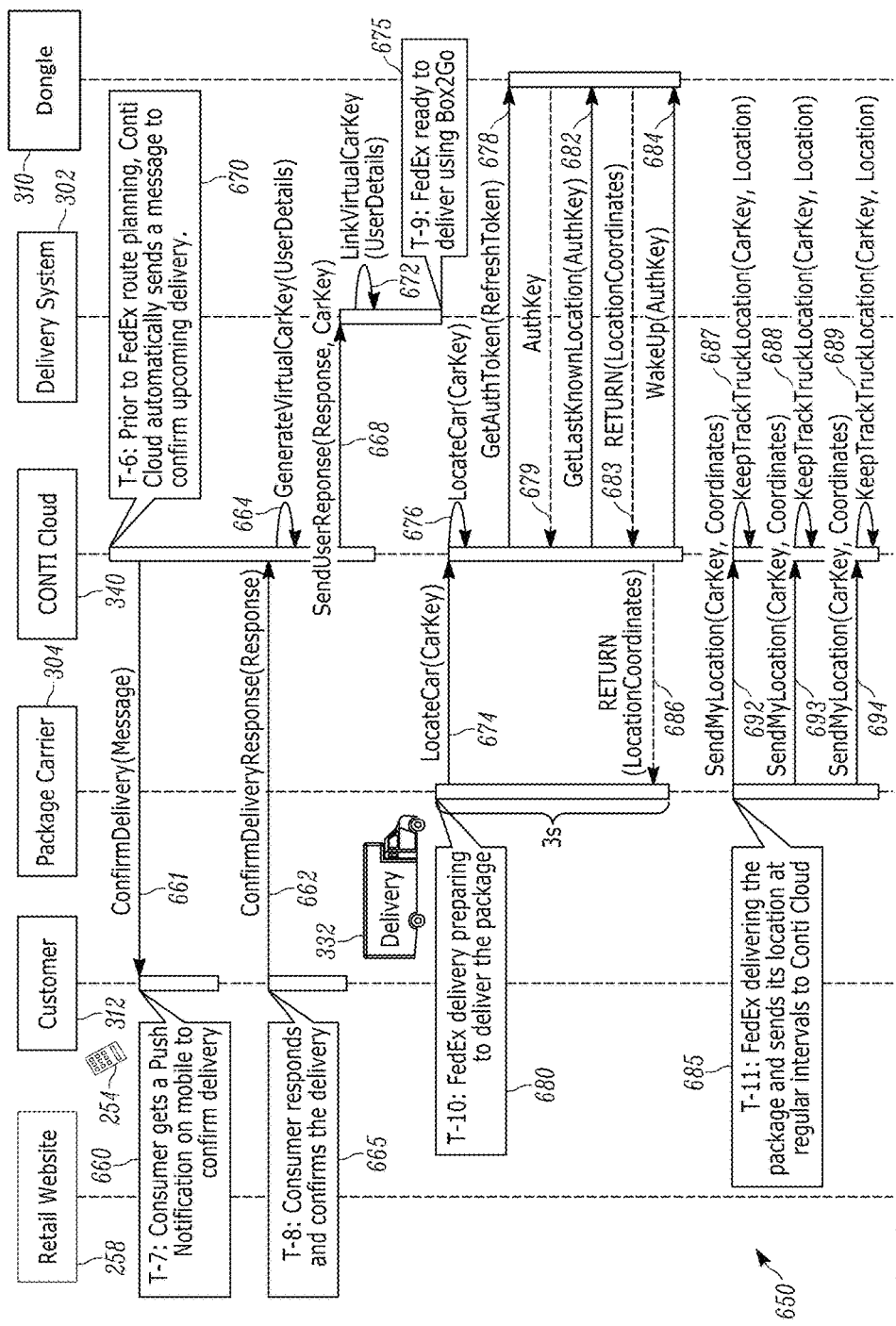

FIGS. 6A-6B illustrate flow diagrams of embodiment of the alternative delivery system.

i) Registration and purchase: There are multiple time periods and methods a customer can select to register with the system-for-geo-proximity-access. Upon registering, a first database in the one or more databases may be also configured to contain and index information regarding for each user including: User ID and password for the system-for-geo-proximity-access, User name, email, etc., security questions, vehicle VIN, vehicle model, color and year, and other similar information.

The shopping experience may be as follows. While shopping at a retail store, at checkout, the customer will i) purchase a product on a retail website e.g. Amazon, BestBuy, eBay, etc., ii) be offered an option on the user interface to have the purchased items delivered to his car using the Box2Go service application in the cloud-based system-for-geo-proximity-access, iii) selects the delivery method as "Box2Go Delivery," to have the package delivered to the vehicle, iv) optionally, selects the expected location of the vehicle to be either work or home, and v) checks-out and places the order with the retailer. The retailer will fulfill the order and prepare the package for delivery and delivers the package with a delivery service provider like FedEx.

ii) The delivery service provider's Box2Go Delivery Process for use cases including communications via Wi-Fi hotspots and blue tooth exchanges between the internal intelligent software in the vehicle itself and the downloaded application resident on the client device.

For packages marked for "Box2Go Delivery", the delivery service provider initiates a query process for the delivery of the package with the system-for-geo-proximity-access in the cloud. The system-for-geo-proximity-access cloud verifies the customer information who requested the package delivery in its system and confirms that the customer has the Box2Go service application in the cloud-based system-for-geo-proximity-access available to allow for such a delivery. The system-for-geo-proximity-access cloud then sends verification back to the delivery service provider's site that the customer can accept a Box2Go delivery.

iii) Shipping Experience

Delivery Planning

1) Prior to the delivery service provider's route planning, the cloud-based system-for-geo-proximity-access sends a push message (preferably early in the morning) to the customer's cell phone of the Customer requesting confirmation for the vehicle delivery for the package with the Order details. The Customer confirms the vehicle delivery option by sending a message back to the cloud-based system-for-geo-proximity-access. The customer may notice a push-message for Box2Go application. Once the cloud-based system-for-geo-proximity-access receives the customer's confirmation for the car delivery, the cloud-based system-for-geo-proximity-access will generate a virtual Car Key. The cloud-based system-for-geo-proximity-access sends a virtual Car Key to the delivery service provider server. The virtual Car Key is issued with a limited shelf life and will expire even if not used within a defined amount of time, such as 4 hours. Note, the dual key security protects against if either the virtual Car key or access token are compromised. The limited shelf life expiration protects against if BOTH the virtual Car Key and access token are compromised, they are only valid for a limited window of time established by the cloud-based system-for-geo-proximity-access. Thus, the security of the vehicle is protected in multiple ways. The delivery service provider system then links the virtual Car Key to the delivery order. The delivery service provider systems are then ready to execute the package delivery to the Customer's vehicle.

Pre-Delivery

2) The delivery service provider prepares the Box2Go package to be delivered to the customer's car. The delivery service provider plans the delivery route based on either the address selected for Box2Go delivery at the time of checkout or the current location of the vehicle. On delivery day, the delivery service provider's delivery vehicle looks up the virtual Car Key associated with the order in the Box2Go app. The delivery service provider contacts the cloud-based system-for-geo-proximity-access to get the location of the car. The cloud-based system-for-geo-proximity-access then receives the last known location of the car and sends it back to the delivery service provider's Box2Go app. If the current location of the vehicle is in his delivery zone, the delivery service provider's system moves ahead with the delivery. If the vehicle to deliver to is not in the delivery zone, then that delivery is skipped and marked for differed mail delivery.

Real-Time Tracking of the Delivery Service Provider's Vehicle

3) While tracking the delivery service provider's delivery vehicle driving toward the delivery location, an application in the delivery vehicle can notify the cloud-based system-for-geo-proximity-access of the delivery vehicle's location. The cloud-based system-for-geo-proximity-access anticipates the delivery of a package to the car and wakes up the vehicle's system by issuing a command. When the delivery service provider's vehicle approaches near the car (like 100 meters), the cloud-based system-for-geo-proximity-access automatically alerts the vehicle and the vehicle starts flashing lights and beeps a few times. This helps the delivery service provider's driver to locate the exact vehicle in a parking lot.

4) To unlock the car once delivery service provider's delivery reaches the car, the application used by the delivery person uses the Box2Go app to send an Unlock command. The cloud-based system-for-geo-proximity-access intercepts this command and issues an Unlock command to the dongle module.

5) The delivery person places the package inside the customer's car, closes the car door/trunk, and then uses the Box2Go app to send a lock command. Like above, the cloud-based system-for-geo-proximity-access intercepts this command and issues a Lock command to the dongle module.

6) A confirmation message is sent from the system-for-geo-proximity-access to the delivery service provider's server and to the customer on the Box2Go app on the customer's cell phone. The delivery process is completed when the system-for-geo-proximity-access destroys the virtual CarKey for the order.

Figure 7B:
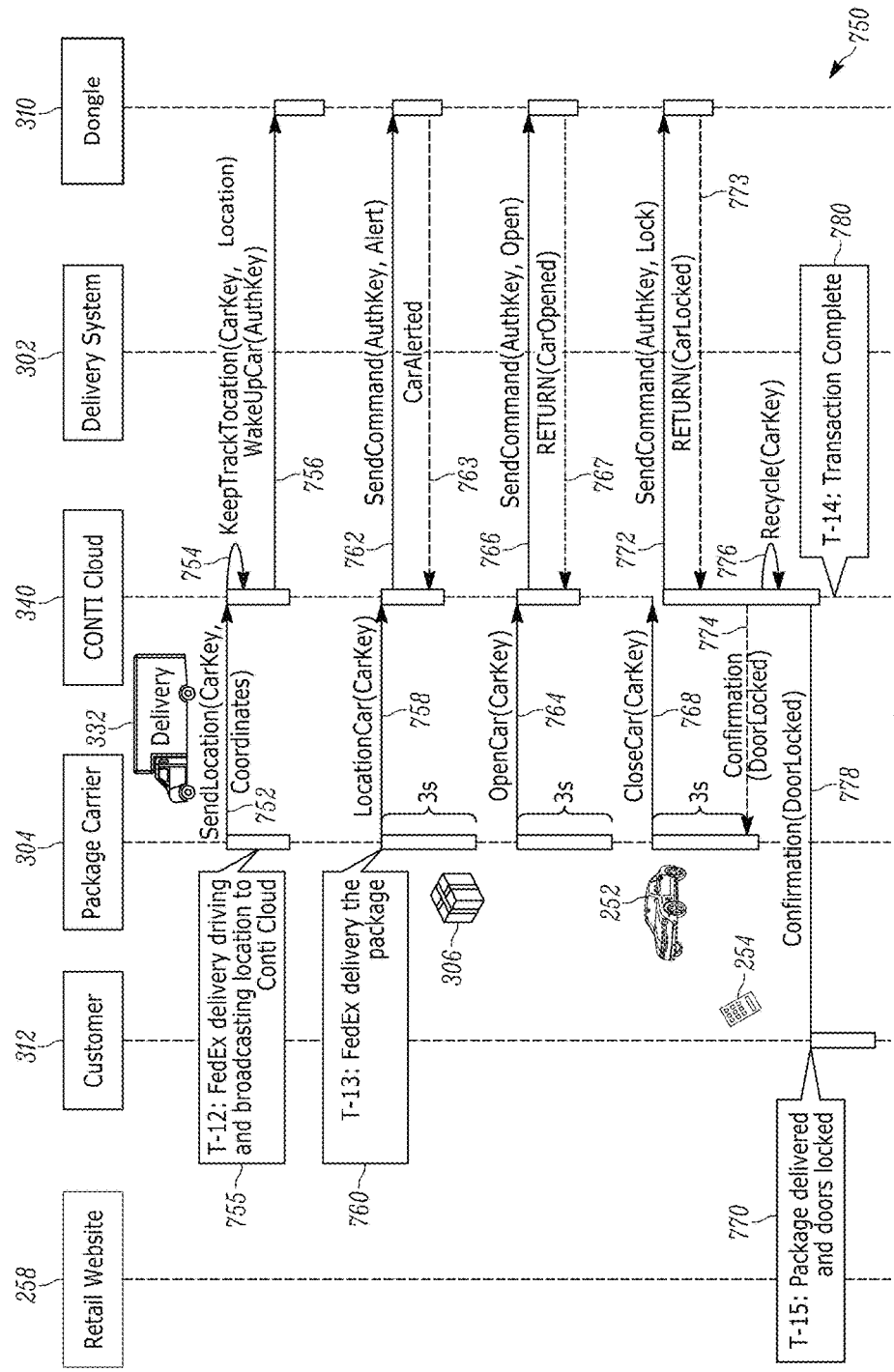
Figure 8A:
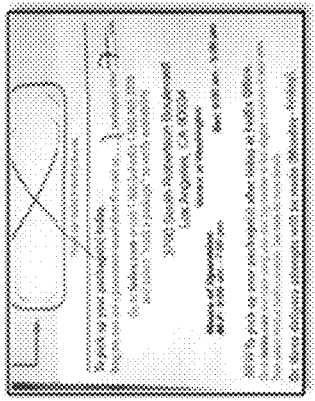
FIGS. 8A-8D illustrate block and flow diagrams of embodiment of the value proposition of the alternative delivery system.
Figure 8A:
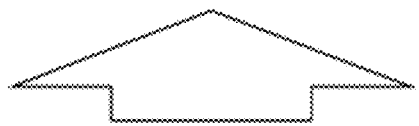
Figure 8A:
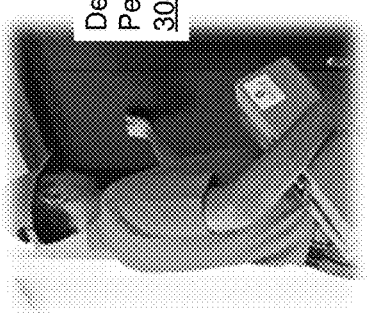
Figure 8A:
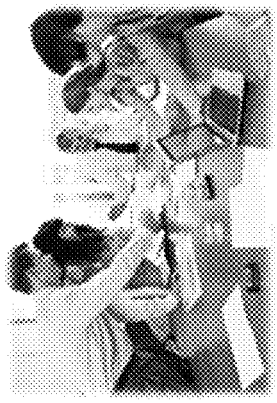
Figure 8B:
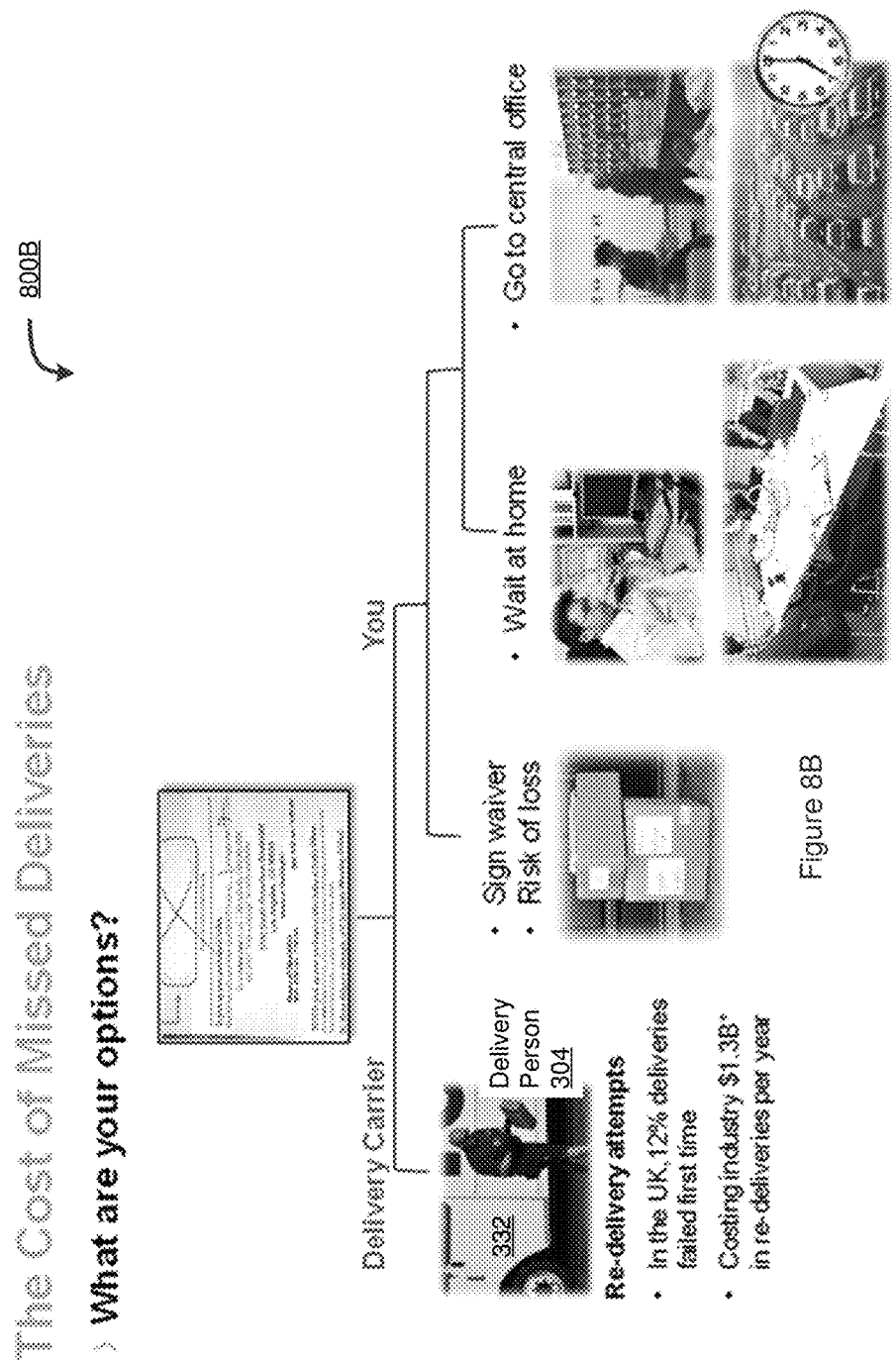
Figure 8C:
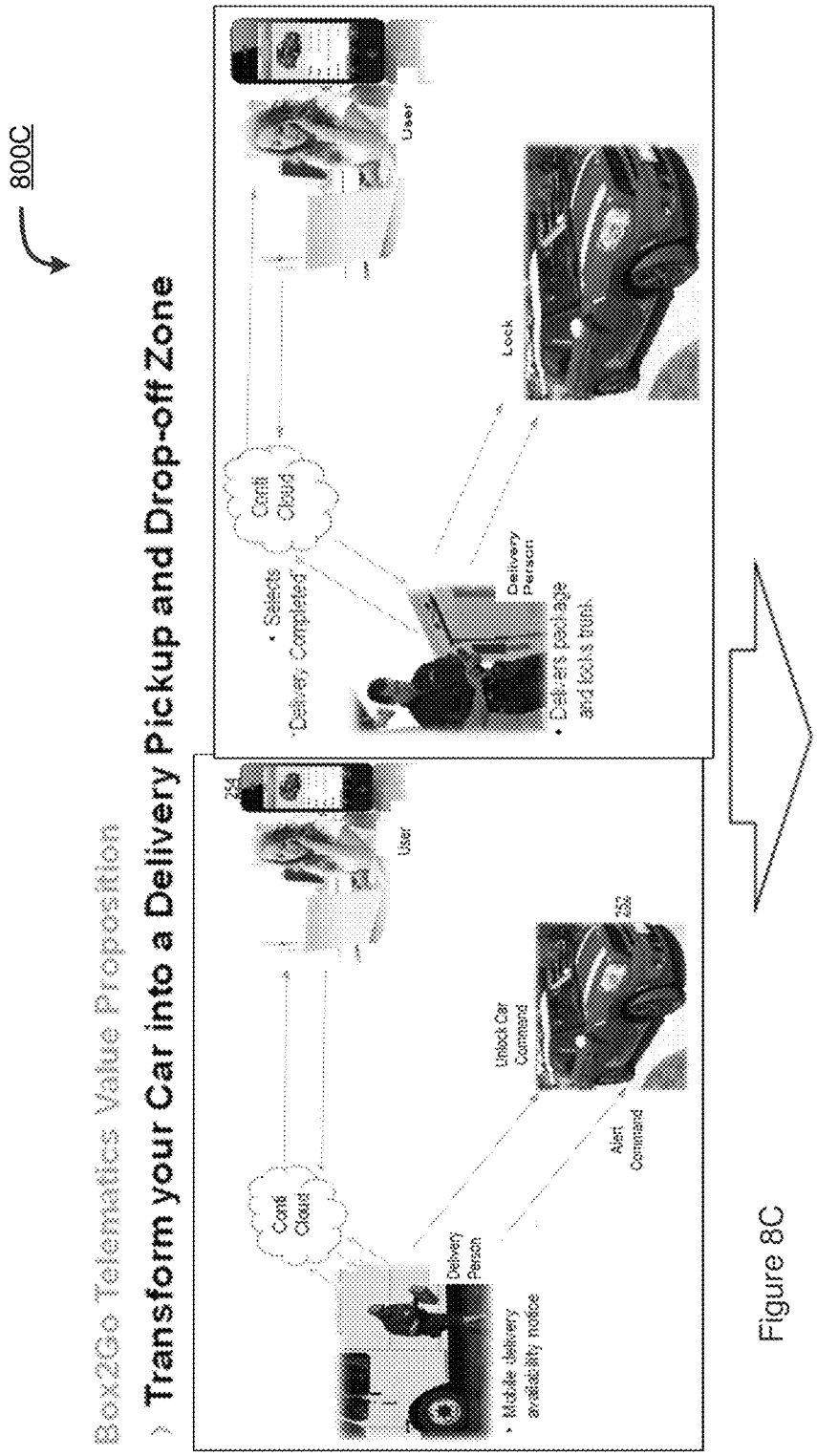
Figure 8D:
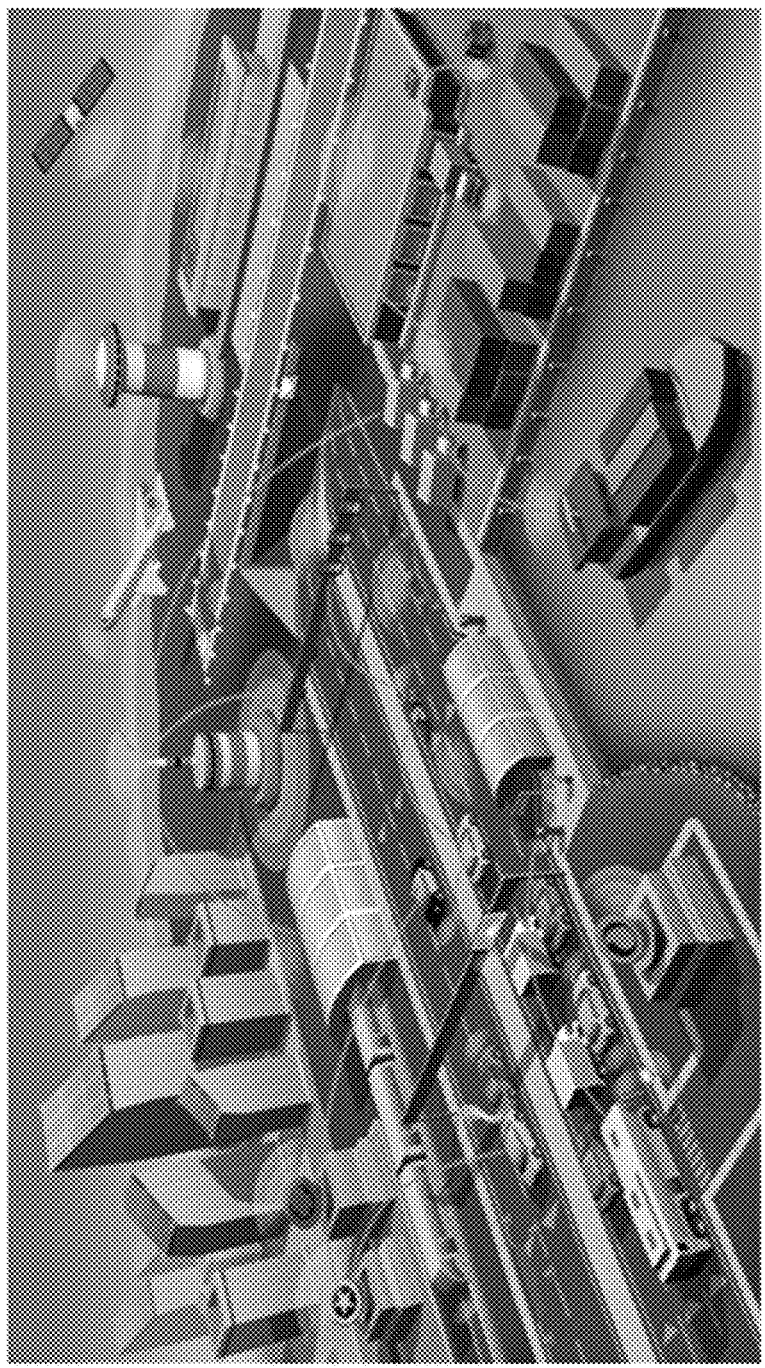
Figure 9A:
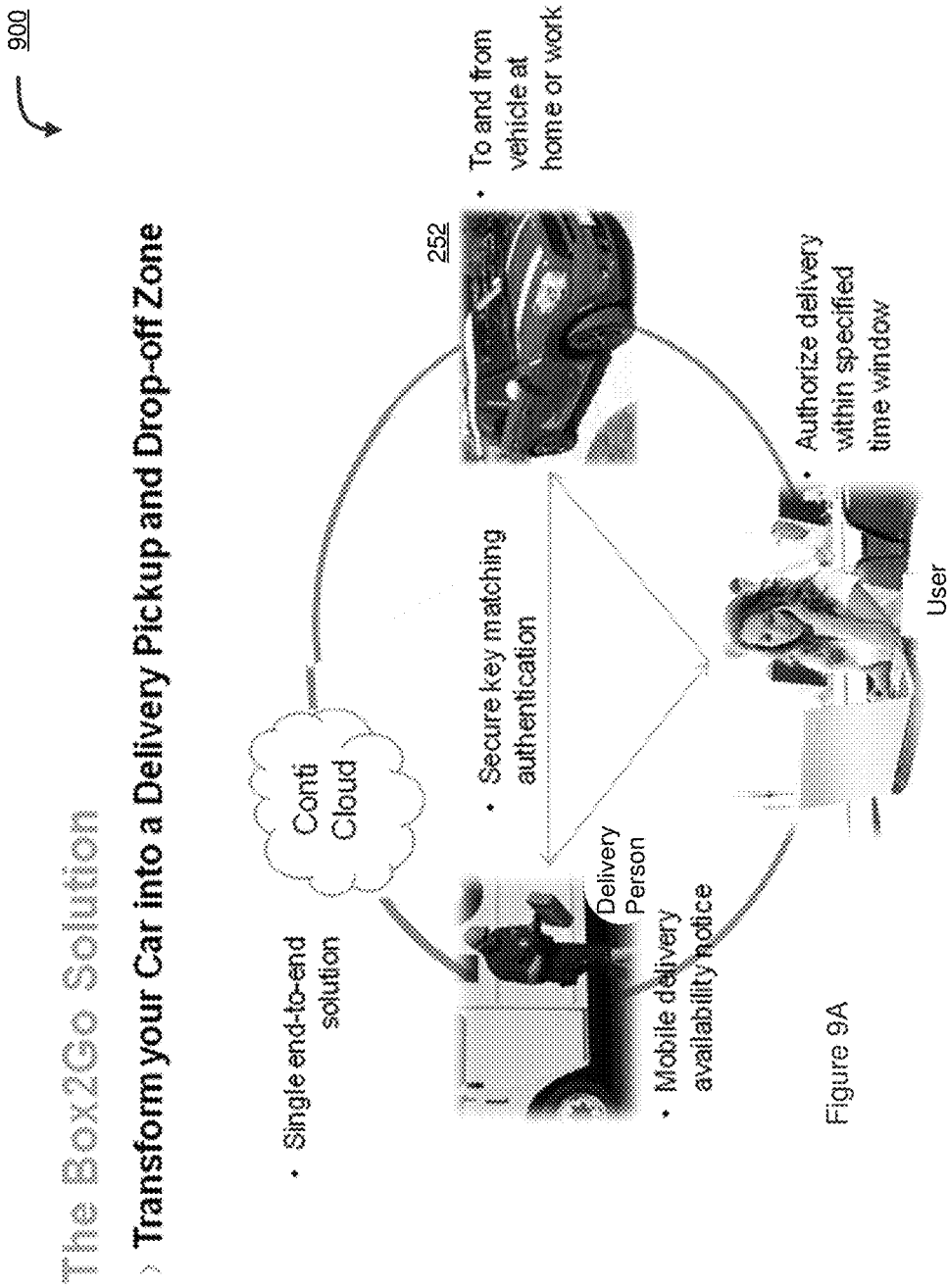
FIGS. 9A-9D illustrate block diagrams of embodiments of the multiple paired virtual keys and security authorization notices used by the alternative delivery system.
Figure 9B:
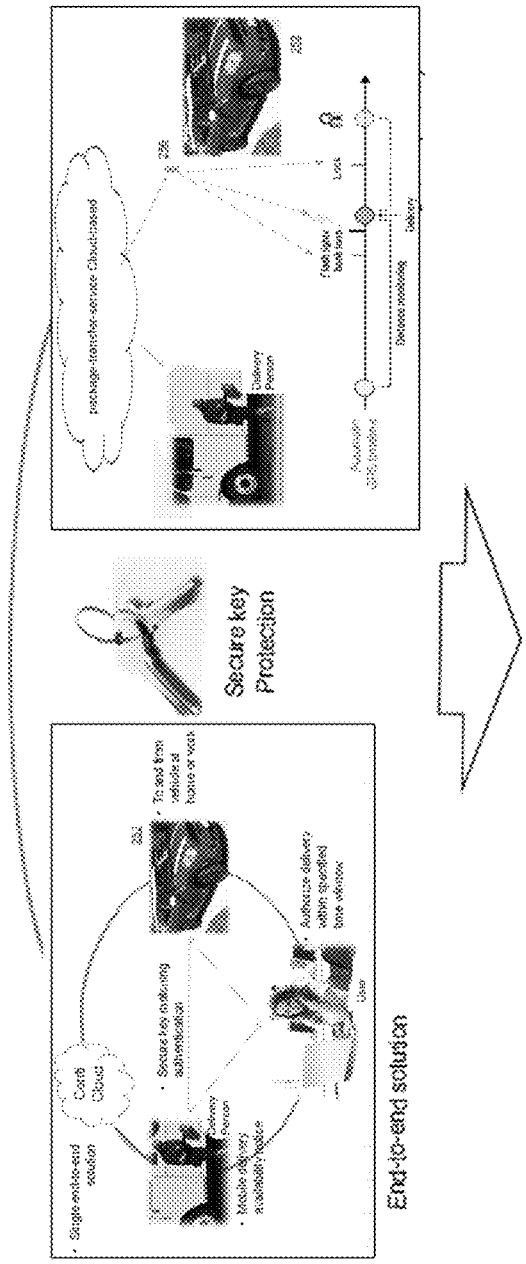
Figure 9C:
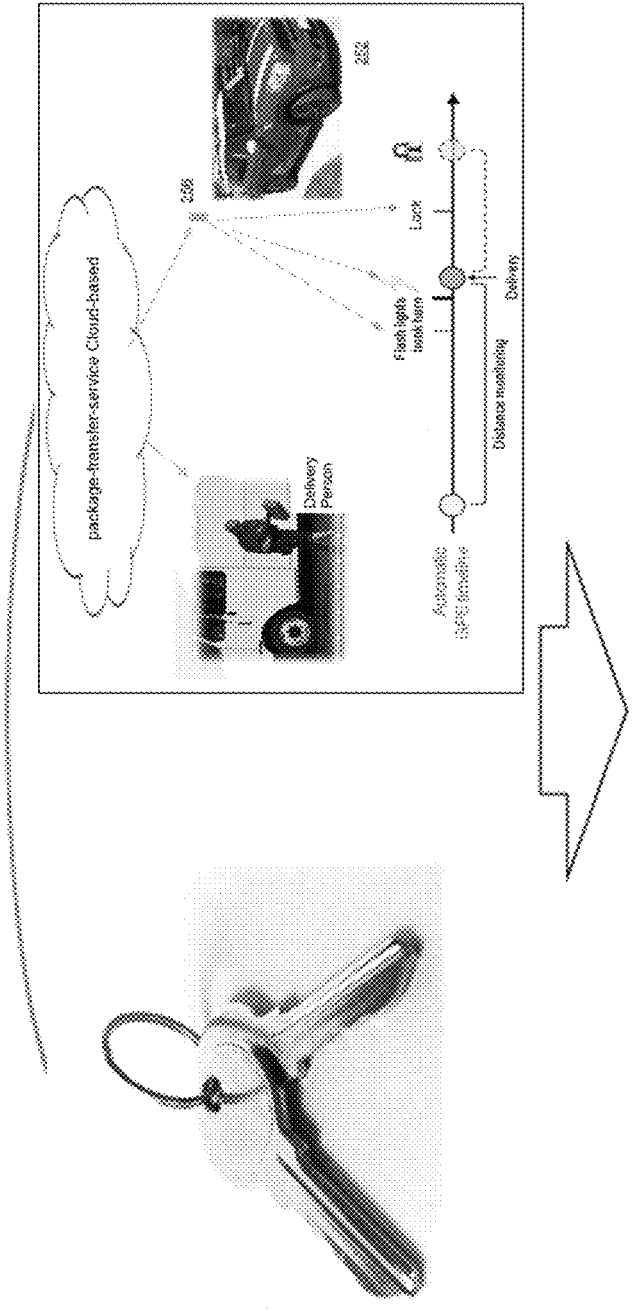
Figure 9D:
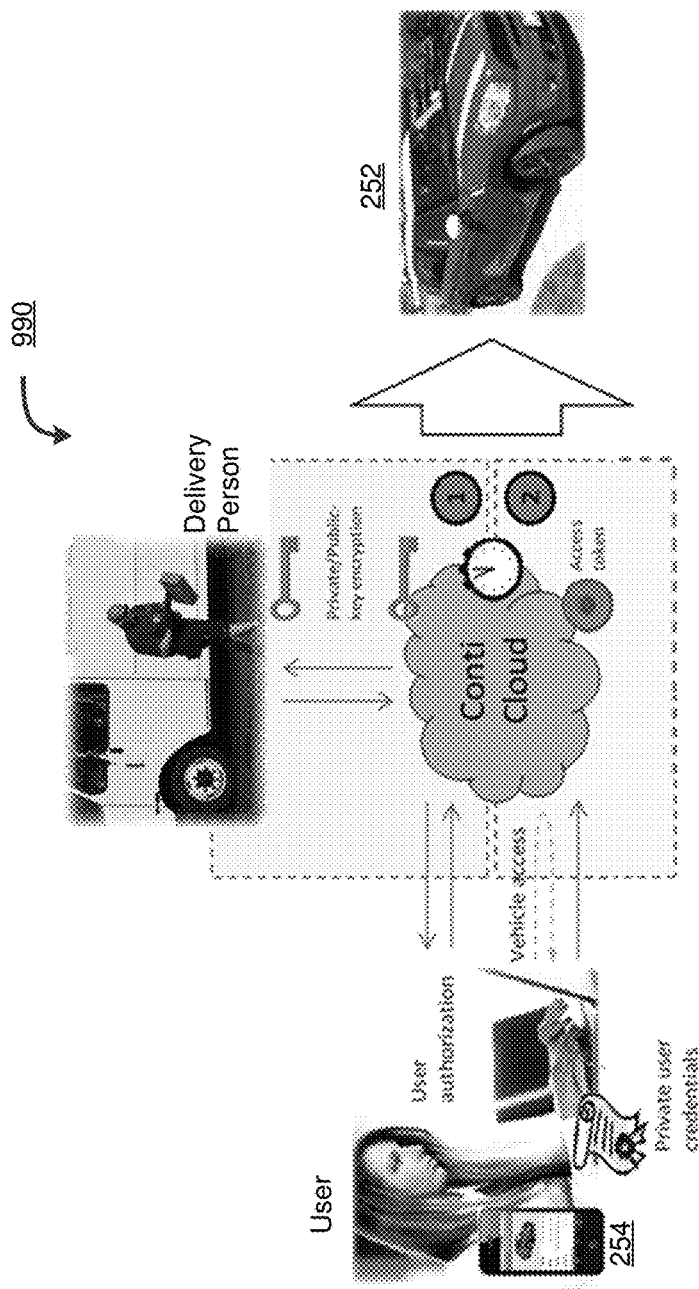
Figure 12:
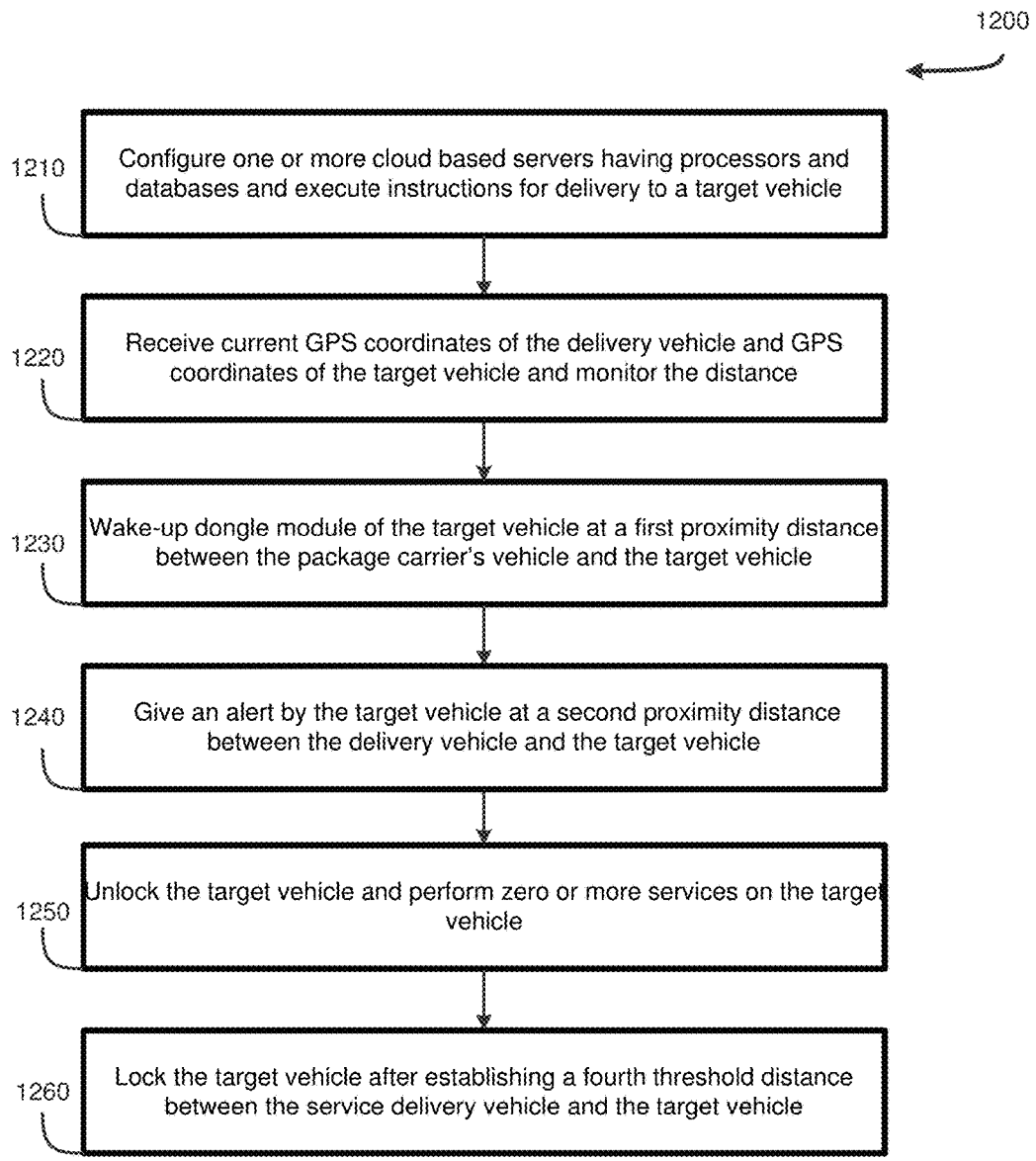
FIG. 12 illustrates a flow graph of an example method of geo-proximity access to a target vehicle using an installed dongle in the vehicle.

FIG. 12 illustrates a flow graph of an example method of geo-proximity access to a target vehicle using an installed dongle in the vehicle. The method 1200 can be used for describing the sequence of numbered steps in diagram 300 or the flow diagrams 600, 650, 750 in FIGS. 6A, 6B, and 7B. One or more cloud based servers having processors and databases are configured to execute instructions by a GPS-based proximity and control module of a cloud based system for delivery to a target vehicle (1210).

The current GPS coordinates of the delivery vehicle and the GPS coordinates of the target vehicle is transmitted from client devices (1220). For example, as shown in FIGS. 3A-3C, current GPS coordinates of the delivery vehicle 322 are calculated. A second client device associated with delivery vehicle and installed in the delivery vehicle 322, or a handheld client device that travels with a delivery person 304 sends using delivery application 315 of the delivery person 304, via cellular communication, the GPS coordinates of the delivery vehicle. Similarly, the current GPS coordinates of the target vehicle 252 is sent by the first client device associate with the target vehicle to the GPS-based proximity and control module of the cloud based system-for-geo-proximity-access 340. The dongle module of the target vehicle can send the current GPS coordinates of the target vehicle 252 to the first client device, in response to a request from the first client device, originated from the GPS-based proximity and control module of the cloud based system. Alternatively, the dongle module can use cellular communication and directly receive requests and send data from/to the GPS-based proximity and control module of the cloud based system.

The dongle module of the target vehicle is woken up at a first proximity distance between the package carrier's vehicle and the target vehicle (1230). As described with respect to FIGS. 3A and 6B, the cloud based system-for-geo-proximity-access 340 monitors the distance between the delivery vehicle 322 and the target vehicle 252. When the distance becomes shorter than a first proximity distance, the cloud-based system-for-geo-proximity-access 340 sends a request to dongle module to wake up the target vehicle 252. The wake up calls can be repeated to make sure the target vehicle does not go to sleep mode. In an embodiment the command may not be a specific wakeup command but may send another command such as a command to send the GPS coordinates and may repeat this command with intervals shorter than the idle time before going to sleep mode of the dongle module of the target vehicle to prevent the dongle module of the target vehicle 252 from going to sleep mode. In an example, the dongle module may not drain much power and thus may not go to sleep to need a wake up. In an example, the dongle module cannot communicate with the GPS-based proximity and control module and no wake up command is sent.

An alert is given by the target vehicle at a second proximity distance between the delivery vehicle and the target vehicle (1240). The cloud based system-for-geo-proximity-access 340 continues monitoring the distance between the delivery vehicle 322 and the target vehicle 252 and when the distance becomes shorter than a second proximity distance, the cloud based system-for-geo-proximity-access 340 sends a request to dongle module to command the target vehicle 252 to alert the delivery person 304 of the location of the target vehicle by performing one or more actions of honking the horn, flashing the lights, and activating the security system. Additionally or alternatively, the delivery person 304 can initiate a request to cloud based system-for-geo-proximity-access 340 for an alert or additional alerts. The alert request is sent by the cloud-based system-for-geo-proximity-access 340 to the dongle module (see, for example, FIGS. 3A and 7B).

The target vehicle is unlocked and one or more services are performed on the target vehicle (1250). As described with respect to FIGS. 3A and 7B, after locating the target vehicle, the delivery person 304 can initiate a request to the cloud based system-for-geo-proximity-access 340 for unlocking and opening a door of the target vehicle 252. The delivery person 304 can deliver a package to the target car 252 or pick up a package from the target vehicle. The unlock request is sent by the cloud based system-for-geo-proximity-access 340 either directly, via cellular communications, to the dongle module, or indirectly to the second client device of the delivery person and then, via Wi-Fi or Bluetooth to the dongle module. In an example, maintenance services can be performed on the target vehicle.

After establishing a fourth threshold distance between the delivery vehicle 322 and the target vehicle 252, the target vehicle is locked (1260) by sending a lock command from the cloud based system-for-geo-proximity-access 340, directly or indirectly through the second client device associated with the delivery person, to the dongle module to lock the target vehicle 252.

In an embodiment, a system for geo-proximity access to a target vehicle 252 can have one or more cloud-based servers that have a first group of one or more processors and one or more ports. The cloud-based servers can cooperate with one or more cloud based databases.

Additionally, a system for geo-proximity access to a target vehicle 252 has a Global Positioning System (GPS) based proximity and control module that can run on the first group of one or more processors and can execute instructions to ensure a secure access by a service delivery person 304 associated with a service delivery vehicle 322 to the target vehicle 252.

The GPS-based proximity and control module of the cloud-based system 340 can receive, via a first cellular communication, current GPS coordinates of the target vehicle 252 from a first client device 254 associated with the target vehicle 252. The GPS-based proximity and control module of the cloud-based system 340 can receive, via a second cellular communication, current GPS coordinates of the service delivery vehicle from a second client device 315 associated with the service delivery person 304. The current GPS coordinates of the service delivery vehicle and the current GPS coordinates of the target vehicle are stored in the one or more cloud based databases 275.

In an embodiment, using the current GPS coordinates of the service delivery vehicle 322 and the current GPS coordinates of the target vehicle 252, the GPS-based proximity and control module can monitor a distance between the service delivery vehicle and the target vehicle.

In an example, through a second cellular communication, the GPS-based proximity and control module can send, via the second client device 315, one or more commands to the on-board dongle module 150 of the target vehicle 252. The commands can include 1) to wake-up the on-board dongle module 150 in the target vehicle 252 while in a close proximity established by a first threshold distance between the delivery vehicle and the target vehicle, 2) to give an alert from the target vehicle 252 while in a close proximity established by a second threshold distance between the delivery vehicle, e.g., delivery vehicle 322 in FIG. 3B or delivery vehicle 262 in FIG. 2C, and the target vehicle 252, 3) to unlock a door including a trunk of the target vehicle for the service delivery person to perform one or more services, and 4) after establishing a fourth threshold distance between the delivery vehicle and the target vehicle, to lock the doors of the target vehicle.

In an example, the GPS based proximity and control module on the cloud-based servers can receive the current GPS coordinated of the target vehicle 252 from the mapping module 122 of the on-board dongle, via a third cellular communication between the on-board dongle module 150 and the cloud based GPS based proximity and control module. The mapping module 122 of the on-board dongle 150 can retrieve the current GPS coordinates of the target vehicle 252 from the one or more memory buffers 110 of the on-board dongle module 150.

Also in an example, the GPS based proximity and control module on the cloud based servers can receive the current GPS coordinated of the target vehicle 252 from first client device 254, via the first cellular communication between the first client device 254 and the cloud based GPS based proximity and control module. Initially, the mapping module 122 of the on-board dongle module 150 can retrieve the current GPS coordinates of the target vehicle 252 from the one or more memory buffers 110 of the on-board dongle module 150 and, via the second transceiver 119, and can send the current GPS coordinates of the target vehicle to the first client device 254.

Further in an example, the GPS based proximity and control module on the cloud based servers can receive the current GPS coordinated of the target vehicle 252 from the first client device 254, via the first cellular communication between the first client device and the cloud based GPS based proximity and control module. Initially, the first client device 254 associated with the target vehicle 252 can determine the GPS coordinates of the target vehicle when an engine of the target vehicle is turned off or when the target vehicle is locked. Then the first client device 254 sends the GPS coordinates of the target vehicle to the GPS based proximity and control module such that the GPS based proximity and control module receives the GPS coordinates of a time when the target vehicle's engine is turned off or when the target vehicle is locked.

In an embodiment, the GPS-based proximity and control module can receive a first virtual key via a first port and one of 1) a request for a service to be performed on the target vehicle, 2) data, or 3) both, from the second client device 315 associated with the service delivery person 304. The first virtual key can have a first shelf life and can be stored in a first database associated with the cloud-based servers. The first virtual key is used by the GPS-based proximity and control module for a first authentication of communications from the second client device 315.

In an embodiment, the GPS-based proximity and control module is further configured to receive a security token associated with both a user and the target vehicle from the first client device associated with the target vehicle, the security token has a second shelf life. The security token is used for a verification of the user 312 and target vehicle 252.

In an embodiment, the GPS-based proximity and control module can send the security token for verification and one or more commands regarding the target vehicle 252 to be executed to the second client device 315 associated with the service delivery person 304. After the first authentication and in an overlap window of time between the first shelf life and the second shelf life, the GPS-based proximity and control module can send the one or more commands regarding the target vehicle 252 to the on-board dongle module 150 installed in the target vehicle. In response to the commands, the on-board dongle 150 module can cause an electromechanical operation in the target vehicle to any of i) open up a door, a window, or a trunk of the target vehicle, ii) unlock the door or the trunk of the target vehicle 252, and iii) any combination of these two, so that the service delivery person 304 can perform the services.

In an embodiment, the on-board dongle module 150 of the target vehicle 252 can receive the commands and the security token via the second client device 315. The RF transmitter of the on-board dongle module 150 can transmit the commands to the RKE module of the target vehicle. The security token is a rolling security key of the RKE module that is included in the transmitted signals and is use by the RKE module for verifying the authentication of the commands.

As described, the commands can include one or more of unlocking doors, opening windows, opening trunks, closing trunks, turning engine on, turning engine off, opening and closing a sunroof or moon roof.

Revenue

FIGS. 8A-8D illustrate block and flow diagrams of embodiment of the value proposition of the alternative delivery system. As discussed above, the user/customer may pay an additional fee on a per delivery/per pick-up instance to use the system-for-geo-proximity-access. The user/customer may pay a monthly or yearly subscription fee for all deliveries and pick-ups of packages to use the system-for-geo-proximity-access. The user/customer may pay on another usage case model. A revenue sharing agreement may be in place between the retailer, the system-for-geo-proximity-access, and the delivery service provider. The delivery service may subsidize the delivery of packages to increase volume, make package delivery more efficient, and eliminate re-delivering of packages. For example, in a survey of United Kingdom deliveries, 12% of deliveries failed first time. This costs the delivery industry $1.3 billion in re-deliveries per year. Advertisers may also subsidize the delivery of packages by placement of advertisements in the order placing and delivery process. Combinations of the above may be used in the revenue generating processes for using the system-for-geo-proximity-access. The backend servers of the delivery service, the system-for-geo-proximity-access, and retailer sites collect and distribute the compensation.

Package Pick-Up

Figure 10:
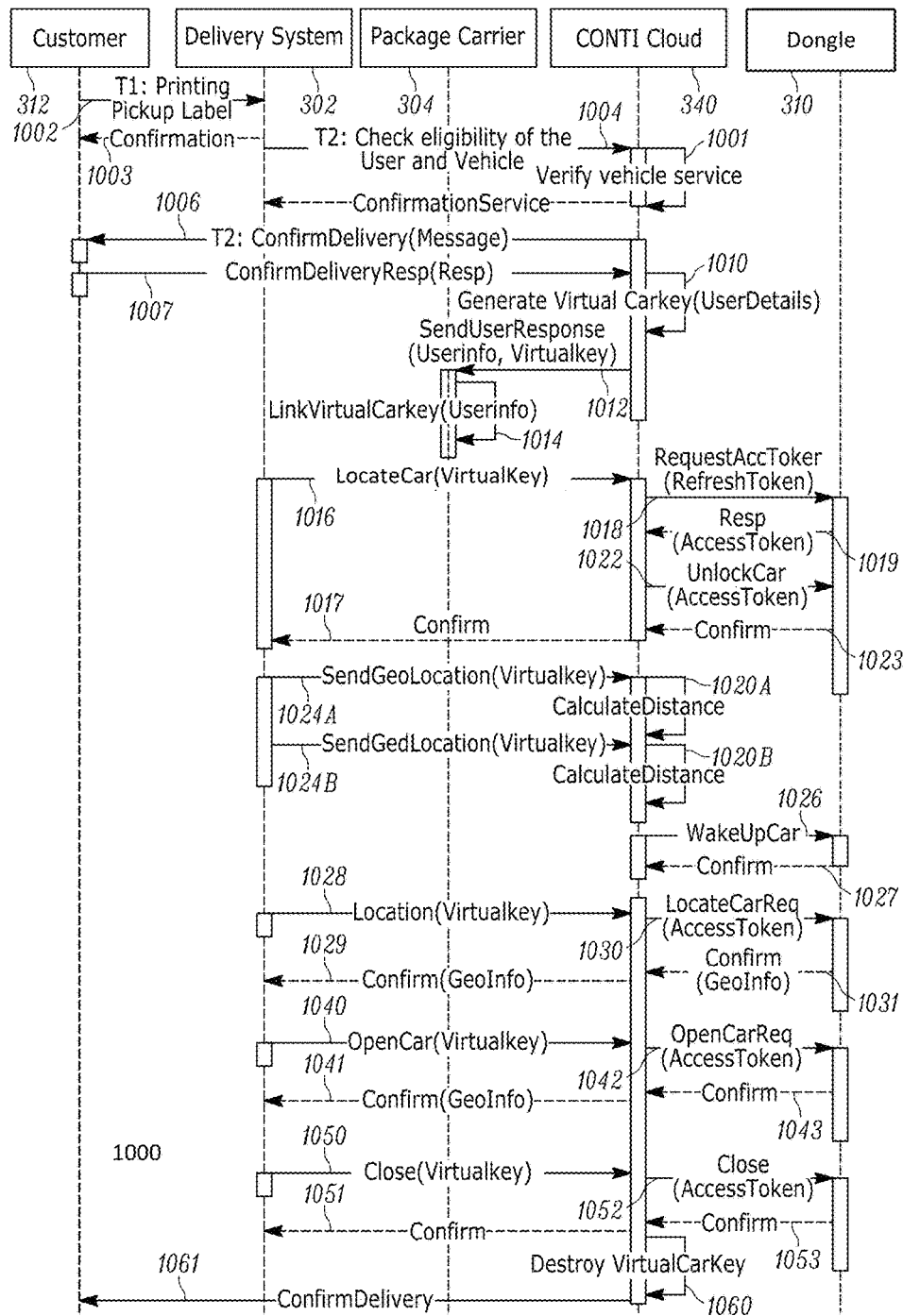
FIG. 10 illustrates a sequence diagram of embodiment of the alternative delivery system.

FIG. 10 illustrates a sequence diagram of embodiment of a package pick up from a user of the system-for-geo-proximity-access. A user of the cloud-based system-for-geo-proximity-access can use the Box2Go application resident on their client device to arrange a package pickup from their vehicle. The Box2Go application resident on their client device will collect the details and send the information to the cloud-based system-for-geo-proximity-access. Additionally, and/or alternatively, a package delivery service web site presents a user interface or web page to collect the details for the user to arrange a package pickup from their vehicle.

Computing System

FIG. 1A illustrates a block diagram of an example computing system that may be used in an embodiment of one or more of the servers, in-vehicle electronic modules, and client devices discussed herein. The computing system environment 800 is only one example of a suitable computing environment, such as a client device, server, in-vehicle electronic module, etc., and is not intended to suggest any limitation as to the scope of use or functionality of the design of the computing system 810. Neither should the computing environment 800 be interpreted as having any dependency or requirement relating to any one or combination of components illustrated in the exemplary operating environment 800.

With reference to FIG. 1A, components of the computing system 810 may include, but are not limited to, a processing unit 820 having one or more processing cores, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computing system 810 typically includes a variety of computing machine-readable media. Computing machine-readable media can be any available media that can be accessed by computing system 810 and includes both volatile and nonvolatile media, removable and non-removable media. By way of example, and not limitation, computing machine-readable mediums uses include storage of information, such as computer readable instructions, data structures, other executable software, or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computing device 800. However, carrier waves would not fall into a computer readable medium. Communication media typically embodies computer readable instructions, data structures, program modules, or other transport mechanism and includes any information delivery media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computing system 810, such as during start-up, is typically stored in ROM 831. RAM 832 typically contains data and/or software that are immediately accessible to and/or presently being operated on by processing unit 820. By way of example, and not limitation, FIG. 1A illustrates operating system 834, software 836, and program data 837.

The computing system 810 may also include other removable/non-removable volatile/nonvolatile computer storage media. By way of example only, FIG. 1A illustrates a hard disk drive 841 that reads from or writes to non-removable, nonvolatile magnetic media nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 1A, provide storage of computer readable instructions, data structures, other executable software, and other data for the computing system 810. In FIG. 1A, for example, hard disk drive 841 is illustrated as storing operating system 844, other software 846, and program data 847. Note that these components can either be the same as or different from operating system 834, other software 836, and program data 837. Operating system 844, other software 846, and program data 847 are given different numbers here to illustrate that, at a minimum, they are different copies.

A user may enter commands and information into the computing system 810 through input devices such as a keyboard 862, a microphone 863, a pointing device 861, such as a mouse, trackball or touch pad. The microphone 863 may cooperate with speech recognition software. These and other input devices are often connected to the processing unit 820 through a user input interface 860 that is coupled to the system bus, but may be connected by other interface and bus structures, such as a parallel port, game port or a universal serial bus (USB). A display monitor 891 or other type of display screen device is also connected to the system bus 821 via an interface, such as a video interface 890. In addition to the monitor, computing devices may also include other peripheral output devices such as speakers 897 and other output device 896, which may be connected through an output peripheral interface 890.

The computing system 810 may operate in a networked environment using logical connections to one or more remote computers/client devices, such as a remote computing device 880. The remote computing device 880 may be a personal computer, a hand-held device, a server, a router, a network PC, a peer device or other common network node, and typically includes many or all of the elements described above relative to the computing system 810. The logical connections depicted in FIG. 1A include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computing system 810 is connected to the LAN 871 through a network interface or adapter 870. When used in a WAN networking environment, the computing system 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, other software depicted relative to the computing system 810, or portions thereof, may be stored in the remote memory storage device. By way of example, and not limitation, FIG. 1A illustrates remote application programs 885 as residing on remote computing device 880. It will be appreciated that the network connections shown are exemplary and other means of establishing a communications link between the computing devices may be used.

As discussed, the computing system may include a processor, a memory, a built in battery to power the computing device, an AC power input, potentially a built-in video camera, a display screen, and a built-in Wi-Fi circuitry to wirelessly communicate with a remote computing device connected to network.

It should be noted that the present design can be carried out on a computing system such as that described with respect to FIG. 1A. However, the present design can be carried out on a server, a computing device devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Vehicle's Intelligent Transport Systems to Integrate with a Connected Network Environment A vehicle has hardware and software that can take control of the vehicle for a short period including activating electromechanical mechanisms that are part of the vehicle. The vehicle has hardware and software for networking between the cloud as well as potentially between other vehicles to cause related automation within the vehicle based on communications between the vehicle and the cloud and/or other vehicles. The vehicle's Cellular Interface system is configured to allow cellular phones access the automobile computer systems, interpret the information and show the text on the cellular phones display while simultaneously transmitting the retrieved information, as well as characteristic and states of the cellular phone used to access the vehicle computer system, to a global network that would alert parties who could assist or benefit from the retrieved automobile information. A cellular phone with a software application can establish a connection with the vehicle's on-board diagnostic computer and/or other on-board intelligent control systems.

The system can interface with a client device, such as a mobile phone, with the on-board computing system in the vehicle. The on-board diagnostic computing device may monitor a set of operational characteristics of a vehicle and communicate that diagnostic to both the driver and with the cloud. The information derived from this system can also be conveyed and processed on a mobile client device coupled with additional information and displayed on the mobile client device's display screen, while simultaneously transmitting this information over the Internet to be stored in a database.

At the point of communication negotiation, an application on the client device extracts position location from the vehicle's navigation system and transmits the response from the vehicle's navigation system and the location to a server ready to receive this information. Alternatively, an application can extract similar position information from GPS module internal to the client device itself.

In an embodiment, the standard for the automotive industry for vehicles may use is the SAE J1850 communications protocol, which utilizes variable pulse width modulation and pulse width modulation. This means that the width of the pulse determines whether it is a 1 or a 0. Most phones form communication with serial connections (RS-232, Infrared . . . etc.) and wireless connection protocols (Bluetooth, Infrared . . . etc.). These two protocols must be converted or bridged by some sort of microprocessor so the two communication methodologies can communicate with each other. This can be accomplished by using an integrated circuit that can be used to convert the OBD-II signal (which includes different protocols such as, but not limited to: J1850 VPW, J1850 PWM, ISO 9141-2, ISO 14230, ISO 15765) to one of the aforementioned phone communication formats.

Network Environment

Figure 2A:
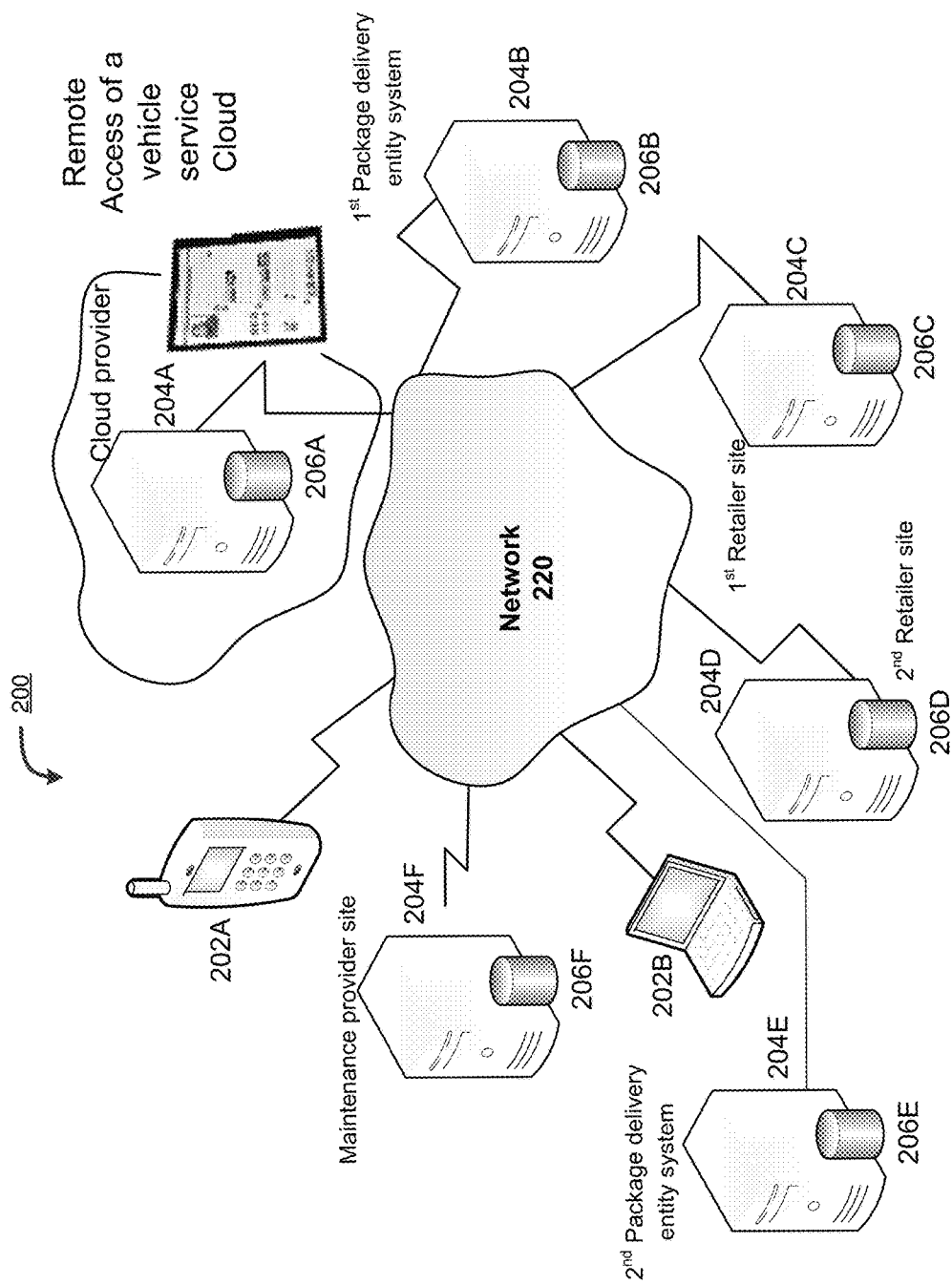
FIGS. 2A-2C illustrate block diagrams of embodiments of the system-for-geo-proximity-access hosted on a cloud-based provider site.
Figure 2B:
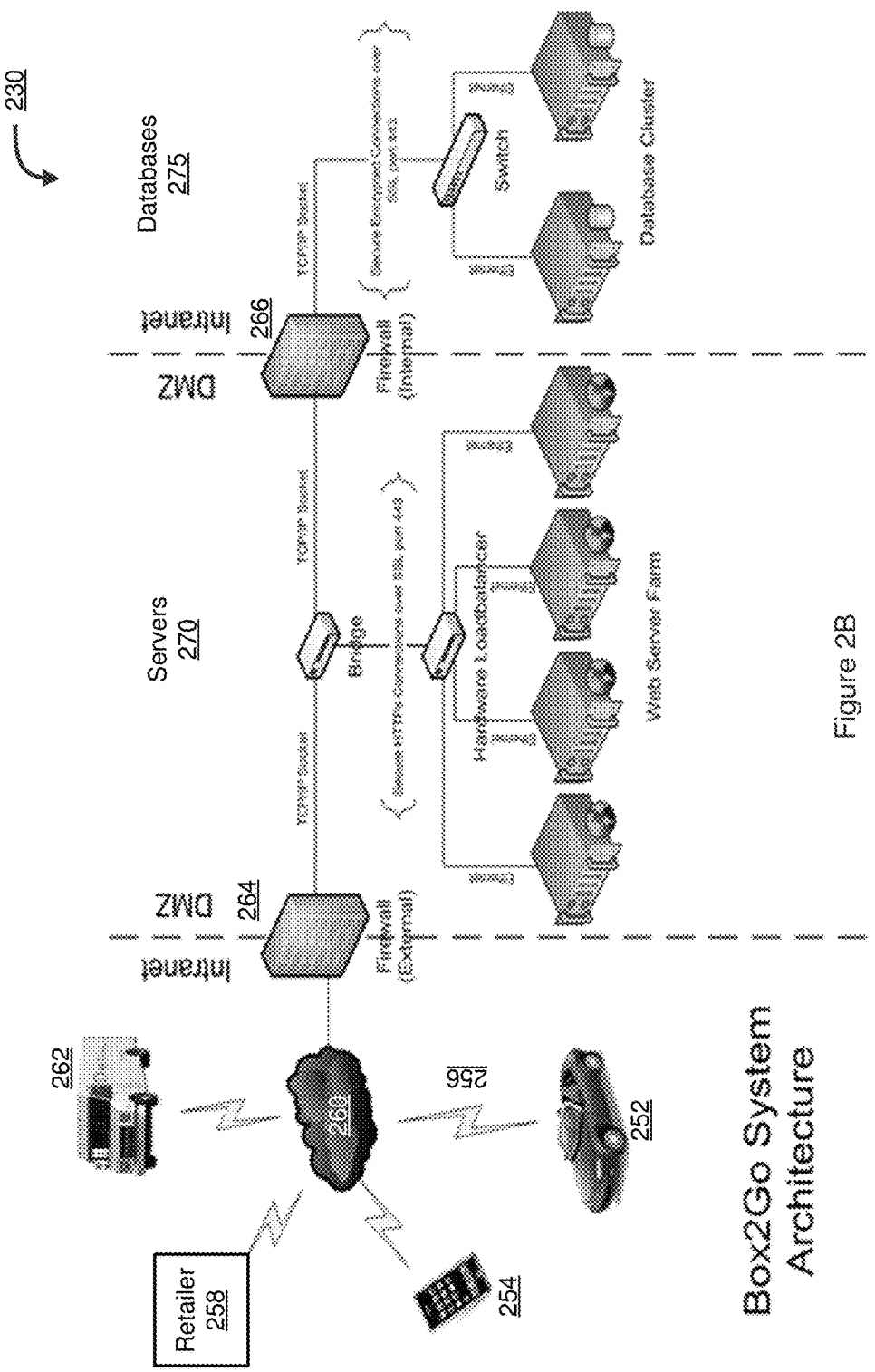

FIGS. 2A-2B illustrate diagrams of a network environment in which the techniques described may be applied. The network environment 200 has a communications network 220 that connects server computing systems 204A through 204F, and at least one or more client computing systems 202A, 202B. As shown, there may be many server computing systems 204A through 204F and many client computing systems 202A through 202B connected to each other via the network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 202A and the server computing system 204A can both initiate and respond to communications, their communication may be viewed as peer-to-peer. Likewise, communications between the client computing systems 204A and 204-B, and the server computing systems 202A and 202B may be viewed as peer-to-peer if each such communicating device is capable of initiation and response to communication. Additionally, server computing systems 204A-204F also have circuitry and software to communication with each other across the network 220. One or more of the server computing systems 204A to 204F may be associated with a database such as, for example, the databases 206A to 206F. Each server may have one or more instances of a virtual server running on that physical server and multiple virtual instances may be implemented by the design. A firewall may be established between a client computing system 202A and the network 220 to protect data integrity on the client computing system 202A. Each server computing system 204A-204F may have one or more firewalls.

Figure 2C:
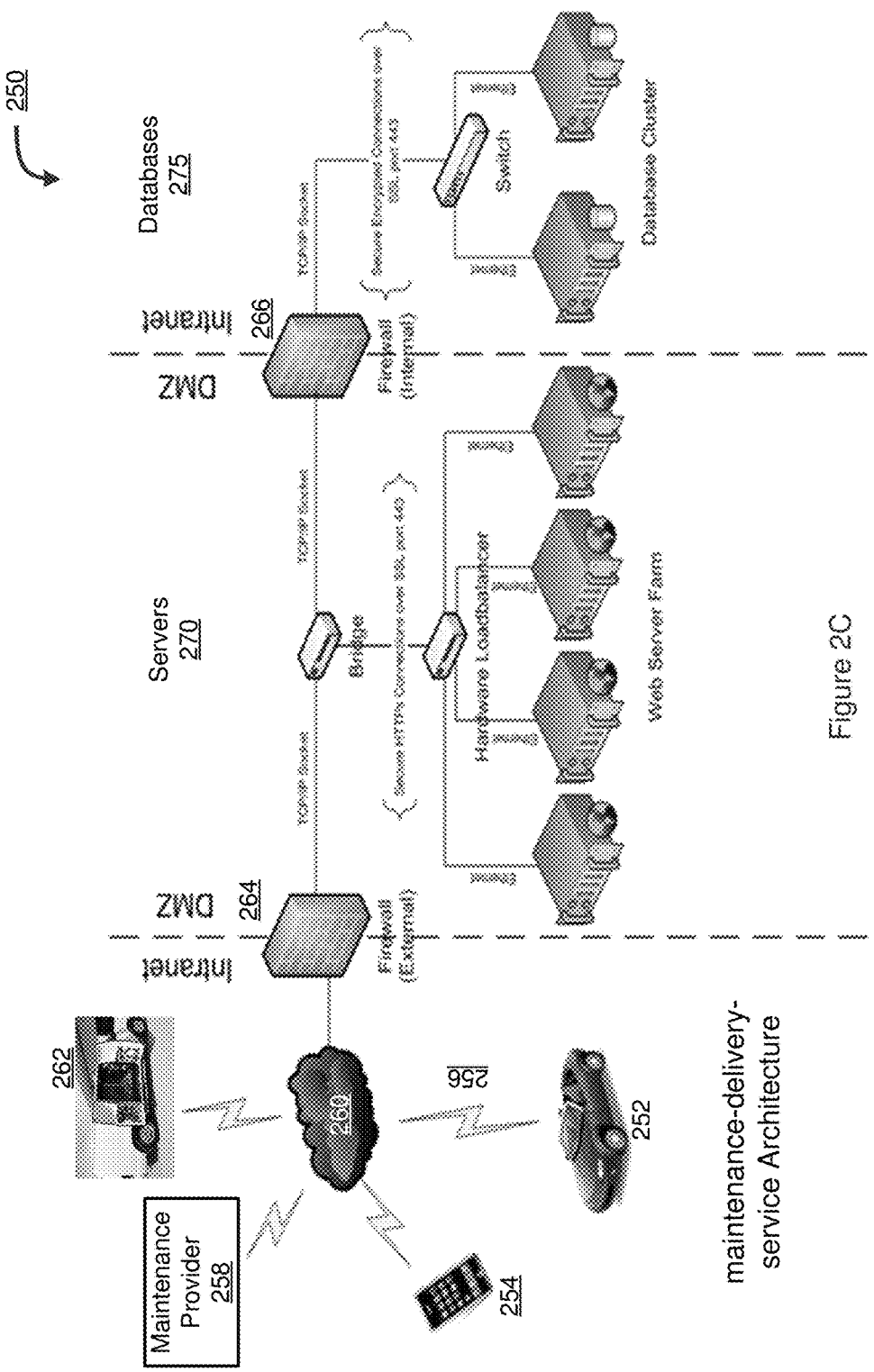

FIGS. 2A-2C illustrate block diagrams of an embodiment of a cloud-based system-for-geo-proximity-access hosted on the cloud-based provider site that automates a package delivery to and pick up from the vehicle process. The cloud-based system-for-geo-proximity-access is hosted on a cloud-based provider site that contains one or more servers and one or more databases.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources. The user is given a virtual amount of dedicated space and bandwidth in the cloud. Cloud applications can be different from other applications in their scalability—which can be achieved by cloning tasks onto multiple virtual machines at run-time to meet changing work demand. Load balancers distribute the work over the set of virtual machines. This process is transparent to the cloud user, who sees only a single access point.

The cloud-based system-for-geo-proximity-access is coded to utilize a protocol, such as Hypertext Transfer Protocol (HTTP), to engage in a request and response cycle with both a mobile device application resident on a client device as well as a web-browser application resident on the client device. The cloud-based system-for-geo-proximity-access has one or more routines to automate a package delivery to and pick up from the vehicle process. The cloud-based system-for-geo-proximity-access can be accessed by a mobile device, a desktop, a tablet device and other similar devices, anytime, anywhere. Thus, the cloud-based system-for-geo-proximity-access hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based system-for-geo-proximity-access, and 5) combinations of these.

The cloud-based system-for-geo-proximity-access has one or more application programming interfaces (APIs) with two or more of the package delivery entity sites, such as FedEx, UPS, etc. The APIs may also be an open source API. One or more of the API's may be customized to closed/non-published APIs of a remote access/connectivity' site and/or package delivery entity site. The cloud-based system-for-geo-proximity-access is coded to establish a secure communication link between each package delivery entity site and the cloud provider site. The software service is coded to establish the secure communication link by creating a tunnel at the socket layer and encrypting any data while in transit between each package delivery entity sites and the provider site as well as to satisfy any additional authentication mechanisms required by the direct lending institution, including but not limited to IP address white listing and token based authentication.

In an embodiment, the server computing system 204 may include a server engine, a web page management component, a content management component, and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

An embodiment of a server computing system to display information, such as a web page, etc. is discussed. An application including any program modules, when executed on the server computing system 204A, causes the server computing system 204A to display windows and user interface screens on a portion of a media space, such as a web page. A user via a browser from the client computing system 202A may interact with the web page, and then supply input to the query/fields and/or service presented by a user interface of the application. The web page may be served by a web server computing system 204A on any Hypertext Markup Language (HTML) or Wireless Access Protocol (WAP) enabled client computing system 202A or any equivalent thereof. For example, the client mobile computing system 202A may be a smart phone, a touch pad, a laptop, a netbook, etc. The client computing system 202A may host a browser to interact with the server computing system 204A. Each application has a code scripted to perform the functions that the software component is coded to carry out such as presenting fields and icons to take details of desired information. Algorithms, routines, and engines within the server computing system 204A take the information from the presenting fields and icons and put that information into an appropriate storage medium such as a database. A comparison wizard is scripted to refer to a database and make use of such data. The applications may be hosted on the server computing system 204A and served to the browser of the client computing system 202A. The applications then serve pages that allow entry of details and further pages that allow entry of more details.

Scripted Code

In regards of viewing ability of an on-line site: the scripted code for the on-line site, such as a website, social media site, etc., is configured to adapted to be i) viewed on tablets and mobile phones, such as individual downloadable applications in data stores that are designed to interface with the on-line site, ii) viewable on a screen in the vehicle, as well as iii) viewable on a screen of a desktop computer via a browser. Those skilled in the relevant art will appreciate that the invention can be practiced with other computer system configurations, including Internet appliances, hand-held devices, wearable computers, cellular or mobile phones, multi-processor systems, microprocessor-based or programmable consumer electronics, set-top boxes, network PCs, mini-computers, mainframe computers and the like.

Mobile web applications and native applications can be downloaded from a cloud-based site. The mobile web applications and native applications have direct access to the hardware of mobile devices (including accelerometers and GPS chips), and the speed and abilities of browser-based applications. Information about the mobile phone and the vehicle's location is gathered by software housed on the phone.

One or more scripted routines for the cloud-based system-for-geo-proximity-access are configured to collect and provide features such as those described herein.

Any application and other scripted code components may be stored on a non-transitory computing machine-readable medium which, when executed on the server causes the server to perform those functions. The applications including program modules may be implemented as logical sequences of software code, hardware logic circuits, and any combination of the two, and portions of the application scripted in software code are stored in a non-transitory computing device readable medium in an executable format. In an embodiment, the hardware logic consists of electronic circuits that follow the rules of Boolean Logic, software that contain patterns of instructions, or any combination of both.

The design is also described in the general context of computing device executable instructions, such as applications etc. being executed by a computing device. Generally, programs include routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Some portions of the detailed descriptions herein are presented in terms of algorithms/routines and symbolic representations of operations on data bits within a computer memory. These algorithmic descriptions and representations are the means used by those skilled in the data processing arts to most effectively convey the substance of their work to others skilled in the art. An algorithm/routine is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms/routine of the application including the program modules may be written in a number of different software programming languages such as C, C++, Java, HTML, or other similar languages.

Many online pages on a server, such as web pages, are written using the same language, Hypertext Markup Language (HTML), which is passed around using a common protocol-HTTP. HTTP is the common Internet language (dialect, or specification). Through the use of a web browser, a special piece of software that interprets HTTP and renders HTML into a human-readable form, web pages authored in HTML on any type of computer can be read anywhere, including telephones, PDAs and even popular games consoles. Because of HTTP, a client machine (like your computer) knows that it has to be the one to initiate a request for a web page; it sends this request to a server. A server may be a computing device where web sites reside—when you type a web address into your browser, a server receives your request, finds the web page you want, and sends it back to your desktop or mobile computing device to be displayed in your web browser. The client device and server may bilaterally communicate via a HTTP request & response cycle between the two.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

The invention claimed is:

1. A method of geo-proximity access for service delivery to a target vehicle, comprising:
   configuring one or more cloud based servers having a first group of one or more processors and one or more cloud based databases;

executing computer-executable instructions on the first group of one or more processors;
executing instructions to ensure a secure access by a service delivery person associated with a service delivery vehicle to the target vehicle;
receiving current GPS coordinates of the target vehicle from a first client device associated with the target vehicle;
receiving current GPS coordinates of the service delivery vehicle from a second client device associated with the service delivery person;
monitoring a distance between the service delivery vehicle and the target vehicle;
waking-up an on-board dongle module of the target vehicle while establishing a close proximity by a first threshold distance between the service delivery vehicle and the target vehicle;
causing the target vehicle to give an alert via any of i) honking a horn, ii) flashing lights of the target vehicle, and iii) activating a security alarm of the target vehicle while in a close proximity established by a second threshold distance between the service delivery vehicle and the target vehicle;
unlocking or opening a door including a trunk of the target vehicle for the service delivery person to perform one or more services with the target vehicle, where the one or more services on the target vehicle to be performed include any of package exchange with the target vehicle, vehicle maintenance to the target vehicle, cleaning the target vehicle, and vehicle repair of the target vehicle; and
locking the target vehicle after establishing a fourth threshold distance between the service delivery vehicle and the target vehicle.

2. The method of claim 1, wherein the on-board dongle module is installed in the target vehicle and has one or more memory buffers, a second group of one or more processors, a first transceiver, a second transceiver, a RF transmitter, a mapping module, and a security module, the on-board dongle module further performing:
coupling the first transceiver of the on-board dongle module to an on-board diagnostic (OBD) port of the target vehicle and communicating with a fault and diagnostic module of the target vehicle;
receiving displacement data including velocity of the target vehicle by the first transceiver, where the displacement data is periodically received and stored in the one or more memory buffers of the on-board dongle module;
configuring the second transceiver of the on-board dongle module to use wireless communications to communicate with one or more client devices including the first client device associated with the target vehicle and the second client device associated with service deliver person;
configuring the RF transmitter of the on-board dongle module to transmit RF signals to command a Remote Keyless Entry (RKE) module of the target vehicle;
performing by the mapping module of the on-board dongle module one of i) receiving GPS signals and calculating GPS coordinates of the target vehicle, or ii) receiving the GPS coordinates of the target vehicle from the first client device associate with the target vehicle;
storing the GPS coordinates of the target vehicle in the one or more memory buffers of the on-board dongle module;
performing by a security module of the on-board dongle module one of i) receiving a current rolling security key of the RKE module of the target vehicle from the second client device associated with the service delivery person, or ii) determining the current rolling security key of the RKE module of the target vehicle, where after receiving a first algorithm and a first data from the second client device associated with the service delivery person, implementing the first algorithm by the security module and using the first data to determine the current rolling security key of the RKE module;
receiving by the security module one or more commands from the second client device associated with a service delivery person;
sending the received commands to the RKE module by transmitting the received commands and the current rolling security key from the RF transmitter to the RKE module of the target vehicle; and
validating the current rolling security key by the RKE module of the target vehicle and then executing the commands.

3. The method of claim 1, further including:
receiving learning commands by the security module of the on-board dongle module from an automated program in the computer-executable instructions of cloud based servers outside the target vehicle to teach the on-board dongle module to become a key fob; and
registering and validating the on-board dongle module with the RKE module of the target vehicle.

4. The method of claim 1, further including:
communicating directly between the computer-executable instructions and the on-board dongle module using cellular communication;
sending the current GPS coordinates of the target vehicle to the computer-executable instructions;
receiving directly one of i) the current rolling security key of the RKE module of the vehicle from the computer-executable instructions, or 2) the first algorithm and the first data from the cloud based servers and to determine the current rolling security key of the RKE module of the vehicle by implementing the first algorithm and using the first data in the first routine running on the second group of one or more processors of the dongle module; and
receiving directly the command to be executed on the target vehicle, where transmitting, via RF transmitters, a command and the current rolling security key to the RKE module of the target vehicle, where the command to be executed by the RKE module of the vehicle after verification of the current rolling security key.

5. The method of claim 1, further including:
communicating indirectly between the computer-executable instructions and the on-board dongle module through the first client device and the second client device;
where sending, through the first client device associated with the target vehicle, the current GPS coordinates of the target vehicle to the computer-executable instructions;
where receiving, through the second client device associated with the service delivery person, one of i) the current rolling security key of the RKE module of the vehicle from the computer-executable instructions, or 2) the first algorithm and the first data from the cloud based servers and to determine the current rolling security key of the RKE module of the vehicle by implementing the first algorithm and using the first data in the first routine running on the second group of one or more processors of the dongle module; and receiving, through the second client device associated with the service delivery person, the command to be executed on the target vehicle, where transmitting, via RF transmitters, a command and the current rolling security key to the RKE module of the target vehicle, where the command to be executed by the RKE module of the vehicle after verification of the current rolling security key.

* * * * *